(12) United States Patent
Otsuka

(10) Patent No.: US 6,879,462 B2
(45) Date of Patent: Apr. 12, 2005

(54) MAGNETIC HEAD CAPABLE OF BEING INCREASED IN SHAPE FREEDOM OF SUPPORT AND MAGNETIC HEAD DEVICE USING THE MAGNETIC HEAD

(75) Inventor: Tomoo Otsuka, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 343 days.

(21) Appl. No.: 10/068,386

(22) Filed: Feb. 6, 2002

(65) Prior Publication Data

US 2002/0109942 A1 Aug. 15, 2002

(30) Foreign Application Priority Data

Feb. 14, 2001 (JP) ........................................ 2001-036497
Feb. 14, 2001 (JP) ........................................ 2001-036499

(51) Int. Cl.[7] ............................................... G11B 5/147
(52) U.S. Cl. ....................................... 360/126; 360/317
(58) Field of Search ................................ 360/126, 317, 360/119, 122, 319

(56) References Cited

U.S. PATENT DOCUMENTS

| | | |
|---|---|---|
| 5,850,326 A | 12/1998 | Takano et al. |
| 5,910,871 A | 6/1999 | Kawanami et al. |
| 6,040,965 A | 3/2000 | Terunuma et al. |
| 6,094,806 A | 8/2000 | McNeil et al. |
| 6,557,242 B1 * | 5/2003 | Santini ........................ 360/119 |

FOREIGN PATENT DOCUMENTS

| | | |
|---|---|---|
| JP | 3-132910 | 6/1991 |
| JP | 4-195801 | 7/1992 |
| JP | 9-167317 | 6/1997 |
| JP | 11-191206 | 7/1999 |
| JP | 2000-123322 | 4/2000 |
| JP | 2000-322712 | 11/2000 |

OTHER PUBLICATIONS

Copy of Office Action dated Oct. 29, 2004 for Japanese Patent Application No. 2001–036499.

* cited by examiner

*Primary Examiner*—Robert S. Tupper
(74) *Attorney, Agent, or Firm*—Brinks Hofer Gilson & Lione

(57) ABSTRACT

A magnetic element has a shape in which the outside portions of a lower shield layer and an upper shield layer, which protrude from both side ends of a trailing-side ABS to both side ends of a slider, retreat from a magnetic functional portion G so as not to be exposed at a protecting layer. Therefore, it is possible to decrease a flying amount between the magnetic functional portion and a disk, and impart design freedom to the slider, thereby permitting the manufacture of a magnetic head having excellent corrosion resistance and adaptable to a higher recording density.

8 Claims, 20 Drawing Sheets

MAGNETIC HEAD CAPABLE OF BEING INCREASED IN SHAPE FREEDOM OF SUPPORT AND MAGNETIC HEAD DEVICE USING THE MAGNETIC HEAD

BACKGROUND OF THE INVENTION

1. Field of the Invention

The present invention relates to a magnetic functional device mounted on a hard disk device, a magnetic sensor, or the like, and a magnetic head device comprising the magnetic functional device. Particularly, the present invention relates to a magnetic functional device capable of an increase in shape freedom of a support and an improvement of corrosion resistance, and a magnetic head device comprising the magnetic functional device. Also, the present invention relates to a magnetic head mounted on a hard disk device or the like to scan a recording surface of a disk in a CSS system, and a magnetic head device comprising the magnetic head. Particularly, the present invention relates to a side gap-type magnetic head capable of effectively realizing a decrease in the flying amount of the magnetic head, and decreasing damage to the disk and the magnetic head, and a magnetic head device comprising the magnetic head.

2. Description of the Related Art

FIG. 11 is a perspective view showing a magnetic head (magnetic functional device) M1 used for a conventional hard disk device, with a disk-facing surface turned upward.

As shown in FIG. 11, a magnetic element 1 comprising a magnetic reproducing element utilizing a magnetoresistive effect and an inductive thin film recording element is provided on the trailing-side end surface of a slider S1 which constitutes the magnetic head M1, a magnetic functional portion G of the magnetic element 1 being exposed at the slider surface. In the magnetic reproducing element, the magnetic functional portion G is a magnetic sensor element such as a spin valve thin film element, while in the thin film recording element, the magnetic functional portion G is a portion interposed between upper and lower core layers.

Also, a leading-side ABS 4 and a trailing-side ABS 5, which are subjected to a flying force (positive pressure) of an air flow between a disk and the slider S1, are formed on the slider surface of the slider S1 to protrude from a recording medium-facing surface 2.

Furthermore, a groove (air groove) 6 is provided on the recording medium-facing surface 2 to be surrounded by the leading-side ABS 4 and the trailing-side ABS 5, for providing negative pressure to the slider S1.

As shown in FIG. 15, a supporting member for supporting the magnetic head M1 comprises a load beam 11 having rigidity and exhibiting predetermined spring pressure at the base end, and a flexure 7 comprising a thin leaf spring provided at the tip thereof, the upper surface of the slider S1 being bonded to the flexure 7. The magnetic head M1 is movable in the pitch direction with the supporting end 7a of the flexure 7 as an oscillation fulcrum.

When the disk D is rotated, an air flow on the surface of the disk flows in between the disk D and the magnetic head M1 from the leading side. The air flow exerts positive pressure on the ABSs 4 and 5 in the direction to fly the magnetic head M1.

The magnetic head M1 flies in an inclined state in which the leading side thereof is raised from the disk, and scans the surface of the disk in a state in which the trailing side of the magnetic head M1 slightly flies above the disk D. In FIG. 15, the flying amount between the magnetic functional portion G of the magnetic head M1 and the disk D is X1.

FIG. 12 is an enlarged partial plan view showing only the periphery of the trailing-side ABS 5 shown in FIG. 11.

As shown in FIG. 12, the magnetic material layers of an upper core layer 8, an upper shield layer (upper core layer) 9 and a lower shield layer 10, which constitute the magnetic element 1, appear in the trailing-side ABS 5. Although not shown in FIG. 12, a magnetoresistive element such as a giant magnetoresistive element (GMR element) appears between the upper shield layer 9 and the lower shield layer 10. The magnetic functional portion G of the magnetic element 1 is determined by the distances between the upper core layer 8 and the upper shield layer 9, between the upper shield layer 9 and the magnetoresistive element, and between the lower shield layer 10 and the magnetoresistive element.

As shown in FIG. 12, the upper shield layer 9 and the lower shield layer 10 are formed to extend beyond the magnetic functional portion G in the width direction (the X direction shown in the drawing) of the slider S1. The width dimension of the lower core layer 9 and the lower shield layer 10 is T1.

Conventionally, in order to prevent both side ends of the lower core layer 9 and the lower shield layer 10, which are exposed at the trailing-side ABS 5, from protruding from the trailing-side ABS 5, the width dimension T2 of the trailing-side ABS 5 in the width direction of the slider S1 is set to be longer than the width dimension T1 of the lower core layer 9 and the lower shield layer 10.

However, the structure shown in FIG. 12 causes the following problem. The trailing-side corners A and B of the trailing-side ABS 5 readily collide with the disk D as the flying amount X1 (refer to FIG. 15) between the magnetic functional portion G and the disk D is further decreased with increases in the recording density in future. Particularly, when the magnetic head M1 is greatly inclined in the roll direction (refer to FIG. 11) during scanning on the disk D, the corners A and B more readily collide with the disk D.

In order to solve the above problem, as shown in FIG. 13, the width dimension of the trailing-side ABS 5 in the width direction of the slider S1 must be decreased from T2 to T3.

As a result, the corners A and B of the trailing-side ABS 5 are brought near the magnetic functional portion G, and thus collision of the corners A and B with the disk D can be appropriately prevented even when the flying amount between the magnetic functional portion G and the disk D is decreased with increases in the recording density.

Also, the surface area of the trailing-side ABS 5 is decreased, thereby decreasing adhesion torque during CSS driving.

However, in the trailing-side ABS 5 having the shape shown in FIG. 13, both side ends 9a and 10a of the lower core layer 9 and the lower shield layer 10, which are extended beyond the magnetic functional portion G in the width direction of the slider S1, protrude from the trailing-side ABS 5 to be exposed at the recording medium-facing surface 2.

FIG. 14 is a partial sectional view of the slider S1 taken along line XIV—XIV in FIG. 13, as viewed from the direction of an arrow.

As shown in FIG. 14, a protecting layer 12 is formed on the trailing-side ABS 5, but the protecting layer is not formed on the recording medium-facing surface 2. This is because the recording medium-facing surface 2 is formed by forming the protecting layer 12 over the entire surface of the slider S1, protecting the portions of the protecting layer 12, which correspond to the trailing-side ABS 5 and the leading-side ABS 4, with resist, removing the portion of the protecting layer 12, which is not covered with the resist, and then removing a portion of the slider surface exposed by removing the protecting layer 12.

Therefore, both side ends 9a and 10a of the lower core layer 9 and the lower shield layer 10 exposed at the recording medium-facing surface 2 are completely exposed to air, and further brought into contact with a solvent used in manufacturing the magnetic head M1, thereby causing the problem of corrosion of the lower core layer 9 and the lower shield layer 10. When the lower core layer 9 and the lower shield layer 10 are corroded, the recording properties and reproducing properties of the magnetic head 1 deteriorate, thereby failing to manufacture the magnetic head M1 appropriately adaptable to a higher recording density in future.

Also, the problem in which the portions of the magnetic element 1, which do not contribute to recording and reproducing, are exposed to deteriorate corrosion resistance is not limited to a magnetic head mounted on a hard disk device, and the problem occurs in other magnetic functional devices, for example, magnetic reproducing devices of a magnetic sensor, a magnetic tape, etc.

The shape of a support (a slider of a magnetic head) of a magnetic functional device greatly depends upon the shape of the magnetic element 1. Namely, for example, in a magnetic head, the shape of the trailing-side ABS 5 formed to protrude from the recording medium-facing surface 2 depends upon the shape of the magnetic element 1, in order to prevent excessive exposure of the lower shield layer 10 and the upper shield layer 9 at the recording medium-facing surface 2. Furthermore, when the shape of the trailing-side ABS 5 is determined, the other ABS 4 is also formed in a certain shape for securing flying stability in consideration of negative and positive pressures.

However, when the shape of the support depends upon the shape of the magnetic element 1 to decrease the design freedom of the shape of the support, there is a problem in which miniaturization of the support cannot be appropriately promoted.

FIG. 32 is a perspective view showing a magnetic head M1 used in a conventional hard disk device with the diskfacing surface turned upward.

As shown in FIG. 32, a magnetic element H comprising a magnetic reproducing element utilizing a magnetoresistive effect and an inductive thin film recording element is provided at the trailing-side end of a slider S1 which constitutes the magnetic head M1, a magnetic functional portion G of the magnetic element H appearing in the slider surface. In the magnetic reproducing element, the magnetic functional portion G is a magnetic sensor element such as a spin valve thin film element as a representative, while in the thin film recording element, the magnetic functional portion G is a portion interposed between upper and lower core layers (not shown in the drawing).

Also, a leading-side ABS 1 subjected to a flying force (positive pressure) of an air flow between a disk and the slider S1, rail surfaces 2 and 3 extending from both sides of the ABS 1 in the slider width direction to the trailing side, and trailing-side ABSs 8 and 10 are formed on the recording medium-facing surface 7 of the slider S1 to protrude from the recording medium-facing surface 7. The magnetic functional portion G appears in the trailing-side ABS 8. Furthermore, a groove (air groove) 4 is provided on the recording medium-facing surface 7 to be surrounded by the leading-side ABS 1, the rail surfaces 2 and 3, and the trailing-sides ABSs 8 and 10, for providing negative pressure to the slider S1.

As shown in FIG. 33, a supporting member for supporting the magnetic head M1 comprises a load beam 11 having rigidity and exhibiting predetermined spring pressure at the base end, and a flexure 6 comprising a thin leaf spring provided at the tip thereof, the upper surface of the slider S1 being bonded to the flexure 6. The magnetic head M1 is movable in the pitch direction with the supporting end 6a of the flexure 6 as an oscillation fulcrum.

When the disk D is rotated, an air flow on the surface of the disk flows between the disk D and the magnetic head M1 from the leading side through an inclined surface 1a. The air flow exerts positive pressure on the ABSs 1, 8 and 10 and the rail surfaces 2 and 3 in the direction to fly the magnetic head M1.

The magnetic head M1 flies in an inclined state in which the leading side thereof is raised from the disk, and scans the surface of the disk in a state in which the trailing side of the magnetic head M1 slightly flies above the disk D. In FIG. 33, the flying amount between the magnetic functional portion G of the magnetic head M1 and the disk D is X1.

The magnetic head M1 shown in FIG. 32 is a side gap-type magnetic head in which the magnetic functional portion G is formed at a position deviating from the center of the width dimension H1 of the trailing-side end of the slider S1 to one of the side ends of the slider S1 in the width direction (the X direction shown in the drawing).

In such a side gap-type magnetic head, in order to decrease the flying amount X1 between the magnetic functional portion G and the disk D, the trailing-side end is brought nearer the disk surface than the leading-side end, and the slider S1 is inclined in the roll direction relative to the disk D, as shown in FIG. 34 (a partial front view of the slider S1 shown in FIG. 33 as viewed from the direction of arrow B), thereby bringing the side end 1c of the slider S1 where the magnetic functional portion G is formed nearer the disk D than the other side end 1d. As a result, the magnetic functional portion G can be further brought near the disk D.

However, as shown in FIG. 35 (an enlarged partial plan view of FIG. 32), the magnetic functional portion G is conventionally formed at the center of the maximum width dimension T2 of the trailing-side ABS 8 where the magnetic functional portion G appears. Therefore, when the slider S1 is inclined in the roll direction as shown in FIG. 34, the corner A of the trailing-side end 8a of the trailing-side ABS 8 nearest the side end 1c of the slider S1 is brought nearest the disk D, not the magnetic functional portion G.

As shown in FIG. 34, the flying amount between the corner A and the disk D is X2 which is smaller than the flying amount X1 between the magnetic functional portion G and the disk D.

Therefore, when the flying amount X1 between the magnetic functional portion G and the disk D is excessively small, the corner A readily collides with the disk D, easily damaging the disk D and the magnetic head M1.

Therefore, the flying amount X1 between the magnetic functional portion G and the disk D must be increased by controlling the roll angle to avoid collision between the corner A and the disk D, thereby increasing a spacing loss and failing to manufacture the magnetic head M1 adaptable to a higher recording density.

Since control of the roll angle depends upon not only the flying amount X1 between the magnetic functional portion G and the disk D but also the flying amount X2 between the corner A and the disk D, the control is easily made troublesome.

Also, the above problem can be solved by decreasing the maximum width dimension T2 of the trailing-side ABS 8. However, with the excessively small width dimension T2, the surface area of the trailing-side ABS 8 is decreased to easily cause wearing of the ABS 8 with the disk D during CSS driving, and the positive pressure produced on the trailing-side ABS 8 is changed to undesirably cause the need to change the slider design. Therefore, the surface area of the trailing-side ABS 8 must be set to a predetermined value.

SUMMARY OF THE INVENTION

Accordingly, an object of the present invention is to resolve the above problem of a conventional magnetic head, and particularly to provide a magnetic functional device capable of being improved in corrosion resistance and imparting shape freedom to a support, and a magnetic head device comprising the magnetic functional device.

Another object of the present invention is to solve the above problem of a conventional magnetic head, and particularly to provide a side gap-type magnetic head capable of being decreased in the flying amount and appropriately avoided from collision with the disk surface, and a magnetic head device comprising the magnetic head.

In order to achieve the objects, the present invention provides a magnetic head comprising a support opposed to a recording medium, and a magnetic element supported by the support and having a magnetic functional portion for performing at least one of magnetic detection and magnetic recording on the recording medium, wherein the magnetic element comprises a laminate of a plurality of films, and the magnetic functional portion positioned at an intermediate portion of the magnetic element in the track width direction, and has a shape in which a portion outside the magnetic functional portion more retreats from the recording medium than the magnetic functional portion, and the magnetic element is supported by the support so that the magnetic functional portion is brought nearer the recording medium than the outside portion.

In the present invention, in the support such as a slider or the like, only the magnetic functional portion is positioned on the recording medium-facing side with the other portions retreating therefrom, thereby imparting shape freedom to the support in miniaturization of the support such as the slider. For example, a tapered shape can be provided, in which the recording medium-facing side is narrowed.

Also, the portions which do not contribute to recording and reproducing are not exposed to prevent excessive corrosion and damage to the medium by a shield layer when the slider slides on the recording medium.

In the present invention, the magnetic element preferably has a shape in which the portion outside the magnetic functional portion retreats from the magnetic functional portion through a step.

In the magnetic element of the present invention, the portion outside the magnetic functional portion preferably has an inclined linear or curved front edge which gradually separates from the magnetic functional portion.

In the present invention, the magnetic element preferably comprises an upper shield layer and a lower shield layer each made of a magnetic material and having a predetermined width dimension, and a magnetic sensor portion functioning as the magnetic functional portion positioned between both shield layers, and the portions of both shield layers outside the magnetic functional portion preferably retreat from the magnetic functional portion.

In the present invention, the magnetic element preferably comprises a lower core layer made of a magnetic material and having a predetermined width dimension, and an upper core layer opposed to the lower core layer with a gap provided therebetween and having a width dimension smaller than the lower core layer, the portion between the lower core layer and the upper core layer is the magnetic functional portion, and the portion of the lower core layer outside the magnetic functional portion preferably retreats from the magnetic functional portion.

In the present invention, the magnetic element is preferably provided on the trailing-side end surface of the slider serving as the support opposed to the recording medium, and a protecting layer made of a magnetic material is provided on the trailing-side end surface to cover the magnetic element.

In the present invention, preferably, an ABS is formed on the recording medium-facing surface of the slider to protrude to the recording medium side and extend from the slider to the protecting layer, the magnetic functional portion of the magnetic element is exposed at the ABS or positioned near the ABS, at least a part of the portion of the magnetic element outside the magnetic functional portion extends beyond the ABS in the width direction so that the front edge of the outside portion is buried in the protecting layer without appearing in the surface of the protecting layer.

In the present invention, at least a part of the portion outside the magnetic functional portion is formed to slightly deviate from the ABS in the width direction, and thus the trailing-side corner of the ABS can be prevented from colliding with the disk even when the flying amount between the magnetic functional portion of the slider is decreased. Also, adhesion torque in CSS driving can be decreased.

In the present invention, the magnetic element is coated with the protecting layer so that the portion protruding from the ABS in the width direction is buried in the protecting layer, without appearing in the surface of the protecting layer. Therefore, unlike a conventional magnetic head, the outside portion of the magnetic element, which protrudes from the ABS in the width direction, is not exposed to air and the solvents used in the process for manufacturing a magnetic head, thereby improving corrosion resistance.

In another aspect of the present invention, a magnetic head device comprises a magnetic head comprising a slider serving as a support, and a supporting member for elastically supporting the slider of the magnetic head from the side opposite to the recording medium-facing surface.

The present invention also provides a magnetic head comprising a magnetic element provided at the trailing-side end of a slider and having a magnetic functional portion performing at least one of magnetic detection and magnetic recording on a recording medium, wherein an ABS is formed on the recording medium-facing surface of the slider so as to be located at a position deviating from the center of the slider in the width direction to one side thereof, and the magnetic functional portion of the magnetic element is provided on the ABS so as to be located at a position deviating from the center of the maximum width dimension of the ABS to the one side of the slider.

The magnetic head of the present invention is a side gap-type magnetic head in which the magnetic functional portion is formed at a position deviating to one side of the slider in the width direction. In the present invention, the magnetic functional portion is provided at the position deviating, to the one side, from the center of the maximum width dimension of the ABS in which the magnetic functional portion appears.

Therefore, in the present invention, the magnetic functional portion can be brought near a corner formed between the trailing-side end of the ABS and the one side end of the ABS, as compared with a conventional magnetic head. When the magnetic head flies above the disk surface at a pitch angle with which the trailing-side end of the slider is nearer the disk than the leading-side end, and at a roll angle with which the one side end of the slider is nearer the disk than the other side end thereof, the flying amount of the corner on the disk is minimum.

Therefore, when the side gap-type magnetic head flies at the roll angle, like in the present invention, the magnetic functional portion G is brought near the corner to decrease the flying amount between the magnetic functional portion and the disk, and avoid collision between the corner of the ABS and the disk. Therefore, it is possible to appropriately decrease the flying amount of the magnetic head and manufacture a magnetic head excellent for a higher recording density.

Like in the present invention, by bringing the magnetic functional portion G near the corner, the flying amount between the corner and the disk need not be considered in controlling the roll angle, as compared with a conventional magnetic head. Therefore, the roll angle can be controlled in consideration of only the flying amount between the magnetic functional portion and the disk, thereby simplifying control of the roll angle.

In the present invention, only the position of the magnetic functional portion is changed without a change in surface area of the magnetic functional portion, and thus appropriate positive pressure is produced on the ABS like in a conventional magnetic head. Therefore, the design of the slider need not be changed, and the surface area of the ABS can be kept at a sufficient value, thereby manufacturing a magnetic head causing less wearing with the disk during CSS driving.

In the present invention, preferably, a notch is formed in the ABS to range from the one side end of the ABS to the center thereof, and the ends of the magnetic functional portion in the track width direction are positioned nearer the center of the ABS than the boundary between the trailing-side edge of the ABS and the notch.

In the present invention, the notch is formed in the ABS to range from the one side end of the ABS to the center thereof, and thus the boundary between the trailing-side edge of the ABS and the notch is brought nearest the disk surface when the magnetic head flies at the pitch angle and roll angle.

In the present invention, the notch is formed, and the ends of the magnetic functional portion in the track width direction are positioned nearer the center than the boundary, thereby appropriately bringing the magnetic functional portion near the trailing-side end of the ABS and bringing the magnetic functional portion near the boundary. Therefore, when the magnetic head flies at the pitch angle and roll angle, a spacing loss can be decreased in both the roll direction and the pitch direction, thereby manufacturing a magnetic head excellent for a higher recording density.

Like in the present invention, by bringing the magnetic functional portion G near the boundary, the flying amount between the boundary and the disk need not be considered in controlling the roll angle, as compared with a conventional magnetic head. Therefore, the roll angle can be controlled in consideration of only the flying amount between the magnetic functional portion and the disk, simplifying control of the roll angle.

In the present invention, the surface area of the ABS is slightly decreased by forming the notch, but the notch is formed in a portion of the trailing-side end of the ABS without decreasing the entire area of the ABS, thereby maintaining the surface area of the ABS at a sufficient value. Therefore, proper positive pressure is produced on the ABS like a conventional magnetic head, and a magnetic head causing less wearing with the disk surface can be manufactured.

In the present invention, the magnetic element comprises a laminate of a plurality of films, and the magnetic functional portion is positioned in an intermediate portion of the magnetic element in the track width direction. Also, the magnetic element preferably has a shape with a width dimension in which a portion protrudes from the one side end of the ABS, and the protruding portion more retreats from the recording medium than the magnetic functional portion, and appears in at least one of a step at an edge of the ABS, and a surface retreating from the ABS through the step.

Alternatively, in the present invention, the magnetic element comprises a laminate of a plurality of films, and the magnetic functional portion is positioned in an intermediate portion of the magnetic element in the track width direction. Also, the magnetic element preferably has a shape with a width dimension in which a portion protrudes from the one side end of the ABS, and the portion protruding from the ABS more retreats from the recording medium than the magnetic functional portion, and is buried so as not to appear in at least one of the step at the edge of the ABS, and the surface retreating from the ABS through the step.

Therefore, the magnetic functional portion can be appropriately brought near the trailing-side corner (or the boundary between the trailing-side edge and the notch) of the ABS which most approaches the disk surface. In the present invention, it is thus possible to attempt to further decrease the flying amount between the magnetic functional portion and the disk, and appropriately avoid damage to the magnetic head and the disk.

In the present invention, the magnetic head is provided at the trailing-side end of the slider, the protecting layer of a nonmagnetic material is provided on the trailing-side end to cover the magnetic element, the ABS and the step at the edge of the ABS are formed to extend from the slider to the protecting layer, and the protruding portion of the magnetic element is preferably formed to be coplanar with the surface of the protecting layer.

Alternatively, in the present invention, the magnetic head is provided at the trailing-side end of the slider, the protecting layer of a nonmagnetic material is provided on the trailing-side end to cover the magnetic element, the ABS and the step at the edge of the ABS are formed to extend from the slider to the protecting layer, and the protruding portion of the magnetic element is preferably buried in the protecting layer.

Therefore, the protecting layer can protect the magnetic element from the outside air and the solvents used in the process for manufacturing a thin film magnetic head, thereby improving the corrosion resistance of the magnetic element.

In the present invention, the magnetic functional portion can be appropriately brought near the trailing-side corner (or the boundary between the trailing-side edge and the notch)

of the ABS which is brought nearest the disk surface. In the present invention, it is thus possible to attempt to further decrease the flying amount between the magnetic functional portion and the disk, and appropriately avoid damage to the magnetic head and the disk.

In the present invention, the magnetic element preferably comprises upper and lower shield layers each made of a magnetic material and having a predetermined width dimension, and a magnetic sensor portion serving as the magnetic functional portion positioned between both shield layers, both shield layers constituting the protruding portion.

In the present invention, the magnetic element preferably comprises a lower core layer made of a magnetic material and having a predetermined width dimension, an upper core layer opposed to the lower core layer with a gap layer provided therebetween and having a width dimension smaller than the lower core layer, and a portion between the lower and upper core layers, which serves as the magnetic functional portion, the lower core layer constituting the protruding portion.

A magnetic head device of the present invention comprise any one of the above-described magnetic heads, and a supporting member for elastically supporting the slider of the magnetic head from the side opposite to the recording medium-facing surface.

DESCRIPTION OF THE PREFERRED EMBODIMENTS

Figure 1:
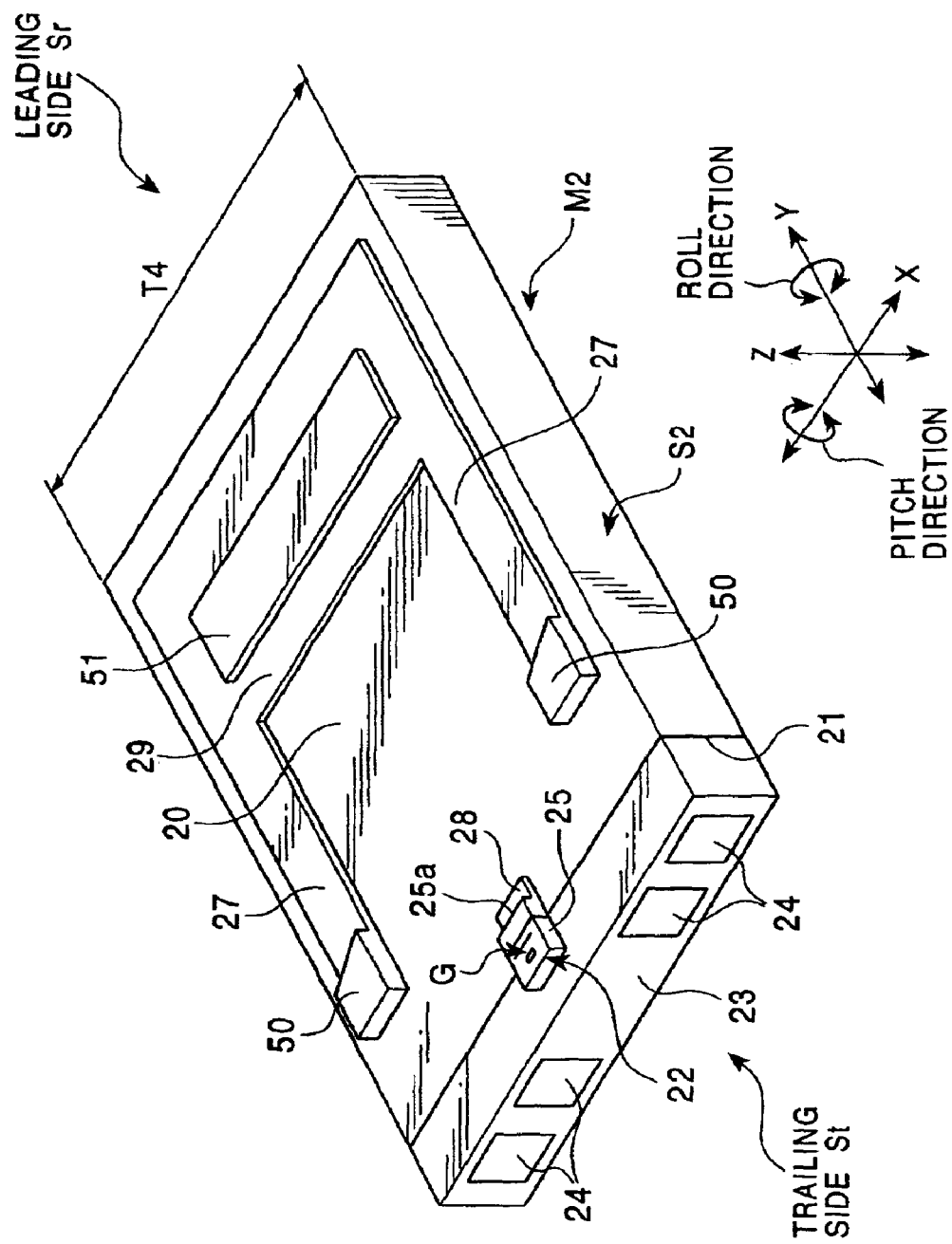
FIG. 1 is a perspective view showing a magnetic head according to a first embodiment of the present invention with a recording medium-facing surface turned upward.

FIG. 1 is a perspective view showing a magnetic head (magnetic functional device) M2 of a magnetic head device according to an embodiment of the present invention with a recording medium-facing surface 20 turned upward.

A slider (support) S2 is made of a ceramic material, for example, such as aluminum titanium carbide ($Al_2O_3$—TiC) or the like. The width dimension T4 of the slider S2 in the width direction (the X direction shown in the drawing) is about 1 mm, for example.

As shown in FIG. 1, a magnetic element 22 comprising, for example, a thin film reproducing element serving as a reproducing magnetic functional portion utilizing a magnetoresistive effect, and an inductive thin film recording element serving as a recording magnetic functional portion is provided at the trailing-side end 21 of the slider S2. The magnetic element 22 may comprise only the thin film reproducing element or the thin film recording element.

Also, a protecting layer 23 made of, for example, Al$_2$O$_3$ or the like is formed on the front side surface of the trailing-side end 21 on the trailing side St, to cover the magnetic element 22 with the protecting layer 23.

As shown in FIG. 1, terminals 24 are provided on the front end surface of the protecting layer 23 on the trailing side St to be respectively connected to the thin film reproducing element and the thin film recording element which constitute the magnetic element 22.

As shown in FIG. 1, a trailing-side ABS 25 is formed on the tailing side St of the slider S2 so as to protrude from the recording medium-facing surface 20 to the recording medium (upward in the drawing). The trailing-side ABS 25 is formed to extend from the slider S2 to the protecting layer 23. The ABS 25 is a surface most protruding from the recording medium-facing surface 20, and thus positive pressure is produced on the ABS 25 when the magnetic head flies above the recording medium with the ABS 25 sliding on the medium during CSS driving.

Furthermore, the magnetic functional portion G of each of the thin film reproducing element and the thin film recording element of the magnetic element 22 appears in the trailing-side ABS 25.

In the present invention, as shown in FIG. 1, a trailing-side step surface 28 lower than the trailing-side ABS 25 by a step is formed between the leading-side end surface 25a of the trailing-side ABS 25 and the recording medium-facing surface 20 so as to protrude from the recording medium-facing surface 20.

In the slider S2 shown in FIG. 1, a leading-side step surface 29 having the same height dimension as the trailing-side step surface 28 is formed on the leading side Sr so as to protrude from the recording medium-facing surface 20. Also, two rail surfaces 27 are formed at the same height as the step surface 29 to extend from both ends of the leading-side step surface 29 in the width direction (the X direction) to the trailing side St and protrude from the recording medium-facing surface 20.

As shown in FIG. 1, side ABSs 50 are formed at the trailing-side ends of the rail surfaces 27 so as to protrude from the recording medium-facing surface 20 toward the recording medium (upward in the drawing).

Furthermore, a leading-side ABS 51 is formed at the center of the leading-side step surface 29 to protrude from the recording medium-facing surface 20 to the recording medium.

The height dimensions of the side ABSs 50 and the leading-side ABS 51 from the recording medium-facing surface 20 are the same as the trailing-side ABS 25.

Figure 8:
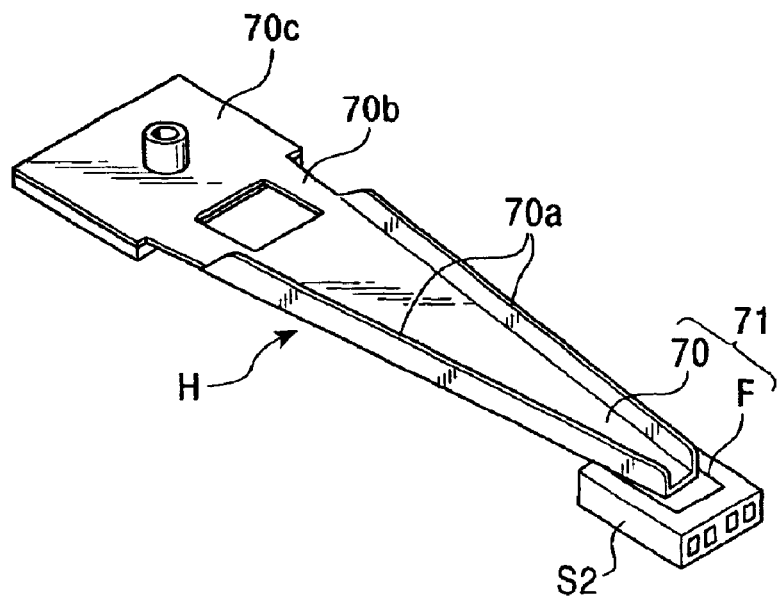
FIG. 8 is a perspective view of a magnetic head device according to an embodiment of the present invention.
Figure 9:
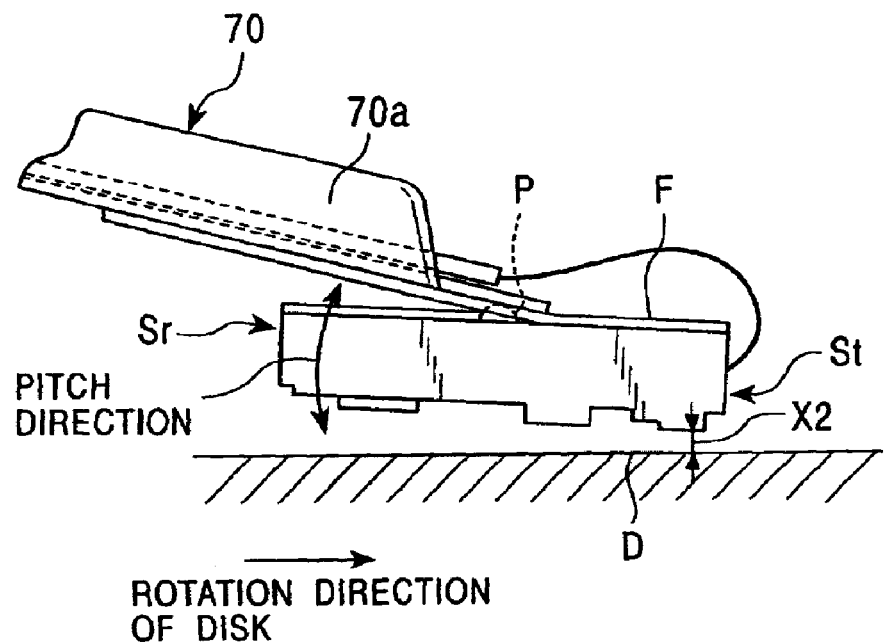
FIG. 9 is a partial side view showing the state in which the magnetic head shown in FIG. 8 flies above a disk

FIG. 8 is a perspective view of a magnetic head device H provided with the magnetic head M2 shown in FIG. 1, and FIG. 9 is a partial side view showing the state in which the magnetic head M2 flies above a disk D.

As shown in FIG. 8, a supporting member 71 for supporting the magnetic head M2 comprises a load beam 70 comprising a leaf spring, and a flexure (elastic supporting member) F comprising a thin leaf spring provided at the tip of the load beam 70.

As shown in FIG. 8, the load beam 70 has a structure in which flexural portions 70a having rigidity are formed on both sides of the load beam 70, and the base end 70b of the load beam 70 where the flexural portions 70 are not formed can exhibit predetermined elastic pressure. Also, a mount portion 70c is provided at the base end 70b of the load beam 70 so that the mount portion 70c is mounted on a mounting surface of a disk device to provide the magnetic head device H in the disk device.

As shown in FIGS. 8 and 9, the magnetic head M2 is bonded to the lower surface of the flexure F from the side opposite to the recording medium-facing surface 20. As shown in FIG. 9, a spherical pivot P is formed on the flexure F to project upward, and the top of the pivot P contacts the load beam 70.

The magnetic head M2 is urged toward the recording surface of the disk D with a weak elastic force by the supporting member 71. In a CSS system, the magnetic head M2 is in contact with the disk D at the start, and a flying force acts on the magnetic head M2 by an air flow produced on the surface of the disk D at the same time as the start of the disk D. As a result, the magnetic head M2 flies in an inclined state in which the leading side Sr is raised from the disk, and scans the surface of the disk D in a state in which the trailing side St of the magnetic head M2 slightly flies above the disk D.

When the disk D is rotated to move the air flow from the leading side Sr of the magnetic head M2 to the trailing side St thereof, positive pressure is produced on each of the ABSs 25, 50 and 51, and negative pressure is produced one the recording medium-facing surface 20 surrounded by the rail surfaces 27 and the leading-side step surface 29.

As shown in FIG. 9, when the magnetic head M2 flies above the disk D, the flying amount between the magnetic functional portion G of the magnetic element 22 and the disk D is X2.

Figure 2:
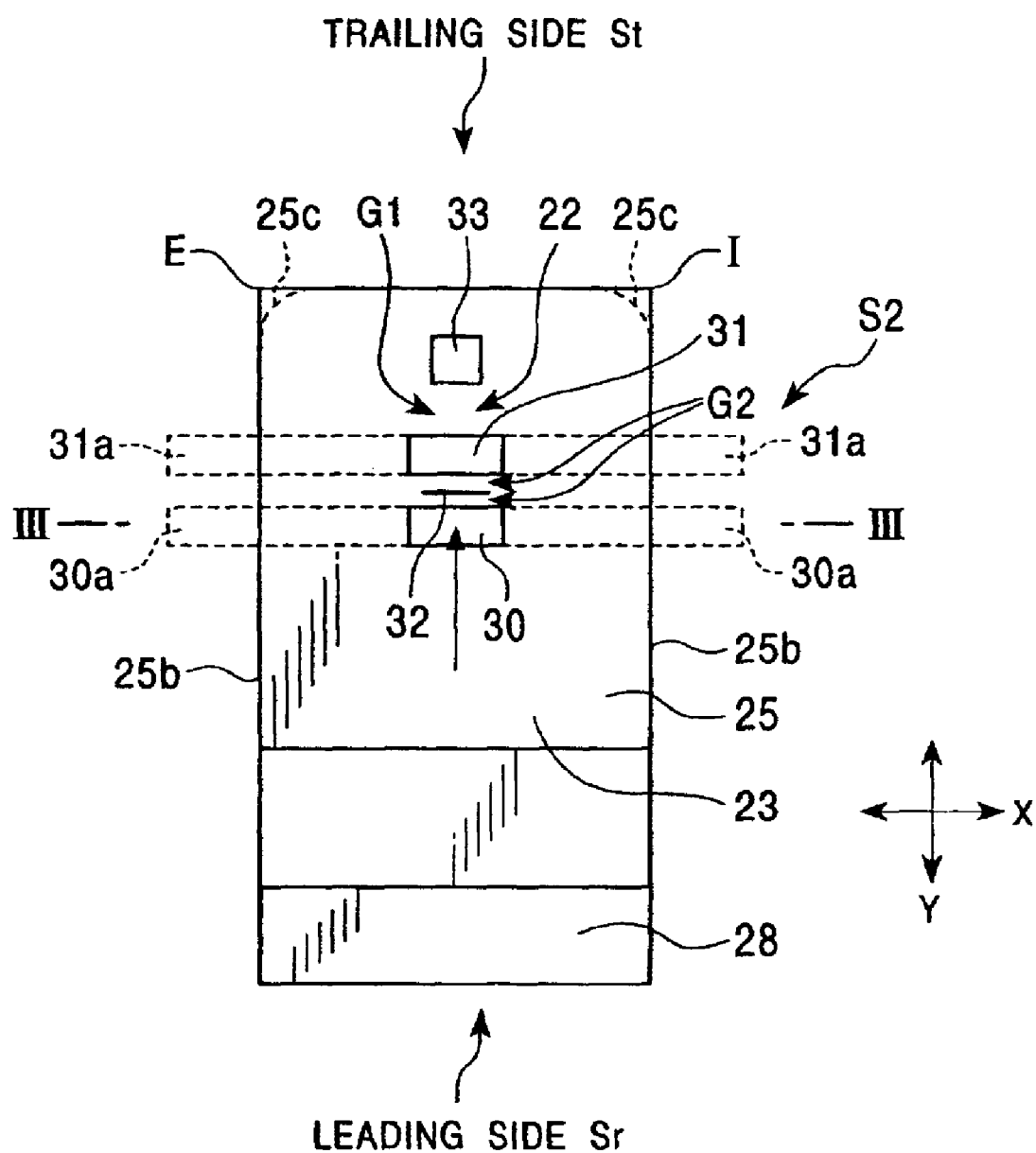
FIG. 2 is an enlarged partial plan view showing only the periphery of the trailing-side ABS shown in FIG. 1.

FIG. 2 is an enlarged partial plan view showing only the trailing-side ABS 25.

As shown in FIG. 2, a plurality of magnetic material layers which constitute the magnetic element 22 appear in the surface of the trailing-side ABS 25.

A thin film reproducing element of the magnetic element 22 comprises a lower shield layer 30 made of a magnetic material such as a NiFe alloy and having a predetermined width, an upper shield layer 31, and a magnetoresistive element 32 comprising an anisotropic magnetoresistive element (AMR element), a giant magnetoresistive element (GMR element) or a tunneling magnetoresistive element (TMR element), which is formed between the lower shield layer 30 and the upper shield layer 31. The magnetoresistive element 32 constitutes the magnetic functional portion G.

The gap is determined by the spaces between the lower shield layer 30 and the magnetoresistive element 32, and between the upper shield layer 31 and the magnetoresistive element 32.

On the other hand, in the thin film recording element, the upper shield layer 31 is also used as a lower core layer, and an upper core layer 33 having a width smaller than the lower core layer appears in the trailing-side ABS 25. The upper shield layer may be formed separately from the lower core layer instead of being also used as the lower shield layer. A coil layer is also formed so as not to appear in the trailing-side ABS 25, for inducing a recording magnetic field in each of the core layers. The portion between the lower core layer 31 and the upper core layer 33 constitutes the magnetic functional portion G1.

In the present invention, the lower shield layer 30 and the upper shield layer (lower core layer) 31 each comprising a magnetic material layer are formed to extend beyond the magnetic functional portions G1 and G2 in the width direction (the X direction) of the slider 2. The outside portions 30a and 31a of the lower shield layer 30 and the upper shield layer (lower core layer) 31 are extended beyond both sides of the trailing-side ABS 25 to both side ends (in the X direction shown in the drawing) of the slider S2. The "outside portion 30a" represents at least a portion protruding from the magnetic functional portions G1 and G2 in the width direction of the slider, with the front edge thereof not exposed at the surface of the protecting layer 23, as described below.

As shown in FIG. 2, the front edges of the lower shield layer 30 and the upper shield layer (lower core layer) 31 are exposed at the trailing-side ABS 25 at the positions where these layers are respectively opposed to the magnetic functional portions G1 and G2. The magnetic functional portions G1 and G2 may be positioned near the trailing-side ABS 25 without being exposed.

The outside portions 30a and 31a are buried in the protecting layer 23 so as not to appear in the surface of the protecting layer 23, as shown by dotted lines in FIG. 2.

Figure 3:
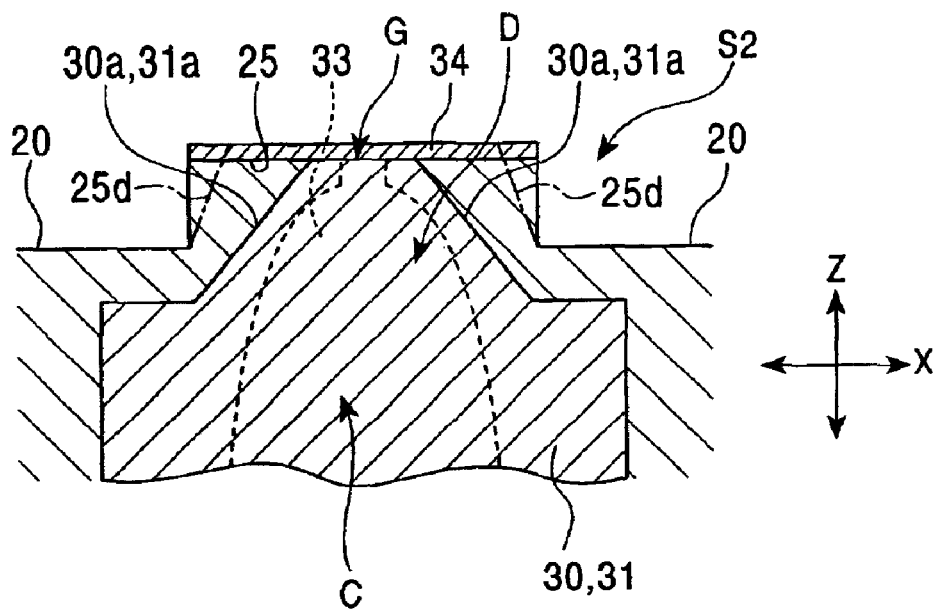
FIG. 3 is a partial sectional view of the slider taken along line III—III in FIG. 2.

The sectional shapes of the lower shield layer 30 and the upper shield layer (lower core layer) 31 taken along the width direction (the X direction shown in the drawing) of the slider S2 in parallel to the thickness direction (the Z direction shown in the drawing) of the slider S2 are, for example, as shown in FIG. 3.

FIG. 3 is a partial sectional view of the slider S2 take along line III—III in FIG. 2, as viewed from the direction of an arrow.

As shown in FIG. 3, the outside portions 30a and 31a of the lower shield layer 30 and the upper shield layer (lower core layer) 31, which are outside the magnetic functional portions G, are formed to retreat from the front edge of the magnetic functional portion G in the direction (the downward direction of the Z direction shown in FIG. 3) to the mounting surface of the slider on which the supporting member 71 is mounted, so that the magnetic functional portion G is brought nearer the disk D than the outside portions 30a and 31a.

For example, in FIG. 3, the front edges of the outside portions 30a and 31a of the lower shield layer 30 and the upper shield layer 31 are formed in inclined lines which gradually retreat from the front edge of the magnetic functional portion G in the direction (the downward direction of the Z direction shown in FIG. 3) to the mounting surface of the slider on which the supporting member 71 is mounted.

Figure 4:
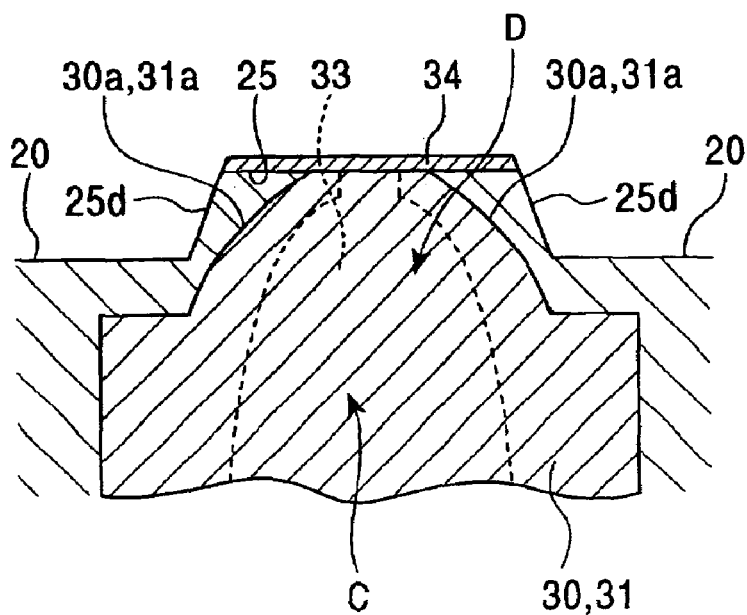
FIG. 4 is a partial sectional view of another form of the slider.

Alternatively, as shown in FIG. 4, the front edges of the outside portions 30a and 31a of the lower shield layer 30 and the upper shield layer 31 are formed in curved lines which gradually retreat from the front edge of the magnetic functional portion G in the direction (the downward direction of the Z direction shown in FIG. 3) to the mounting surface of the slider on which the supporting member 71 is mounted.

Figure 5:
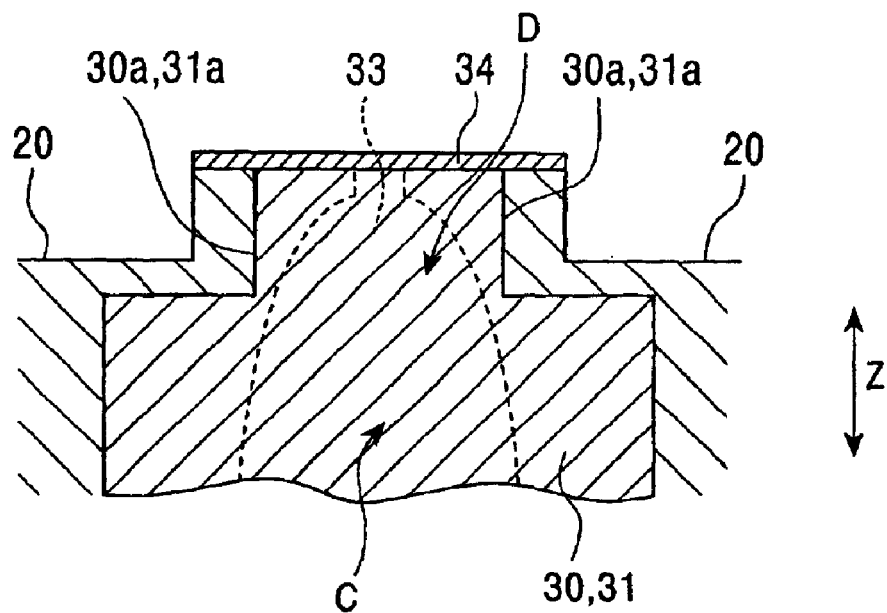
FIG. 5 is a partial sectional view of still another form of the slider.

Alternatively, as shown in FIG. 5, the front edges of the outside portions 30a and 31a of the lower shield layer 30 and the upper shield layer 31 are stepped so as to retreat from the front edge of the magnetic functional portion G in the direction (the downward direction of the Z direction shown in FIG. 3) to the mounting surface of the slider on which the supporting member 71 is mounted.

In any one of the shapes shown in FIGS. 3 to 5, each of the lower shield layer 30 and the upper shield layer 31 comprises a wide rear region C and a front region D provided nearer the trailing-side ABS than the rear region C and having a width dimension smaller than the rear region C. In the front region D, the front edges of the outside portions 30a and 31a retreating from the magnetic functional portion G are formed in any one of the above-described shapes.

As shown in FIG. 3, the rear region C preferably has a large width dimension from the viewpoints of suppression of magnetic saturation of the lower shield layer 30 and the upper shield layer 31 and improvement in the shielding function.

As shown in FIG. 3, a protecting layer 34 made of diamond-like carbon (DLC) is preferably formed on the trailing-side ABS 25. This prevents the lower shield layer 30, the upper shield layer (lower core layer) 31, the magnetoresistive element 32 and the upper core layer 33, which are exposed at the trailing-side ABS 25, from contacting directly the disk surface during CSS driving, thereby preventing damage to each of the layers due to friction with the disk surface. Also, each of the layers can be prevented from being exposed to the outside air and the solvents used in the process for manufacturing the magnetic head, thereby appropriately preventing corrosion of each of the layers.

Figure 6:
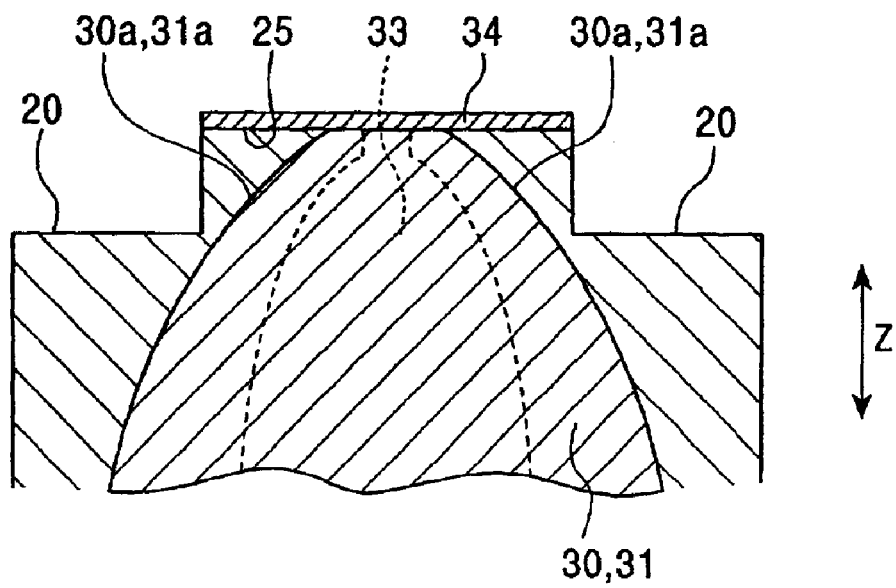
FIG. 6 is a partial sectional view of a further form of the slider.

In the present invention, as shown in FIG. 6, the entire front edges of the outside portions 30a and 31a of the upper shield layer 31 and the lower shield layer 30 may be formed in inclined or curved surfaces so that the width dimension gradually increases as the front edges retreat from the front edge of the magnetic functional portion G to the mounting surface (the downward direction of the Z direction) of the slider on which the supporting member 71 is mounted.

The upper shield layer 31 and the lower shield layer 30 need not have the same shape.

In the present invention, the outside portions 30a and 31a of the lower shield layer 30 and the upper shield layer (lower core layer) 31 formed to retreat from the magnetic functional portion G away from the disk, and the front edges of the outside portions 30a and 31a are buried in the protecting layer 23 without being exposed at the surface of the protecting layer 23. Therefore, unlike in a conventional magnetic head, the lower shield layer 30 and the upper shield layer 31, which protrude from the trailing-side ABS 25 in the width direction, are not exposed to the outside air, and do not contact the solvents used in the process for manufacturing the magnetic head M2, thereby manufacturing the magnetic head M2 having excellent corrosion resistance.

In the present invention, the trailing-side ABS 25 can be formed in such a small size that the lower shield layer 30 and the upper shield layer 31, which constitute the magnetic element 22, protrude from the trailing-side ABS 25 in the width direction, increasing the shape freedom of the slider S2. Therefore, in the present invention, the slider S2 can easily be formed in a small size according to the customer's demand and operating environment.

Furthermore, when the trailing-side ABS is formed in a small size, the trailing-side corners E and I (refer to FIG. 2) of the trailing-side ABS 25 can be prevented from colliding with the disk D even when the flying amount X2 between the magnetic functional portion G and the disk D is decreased, and adhesion torque in CSS driving can also be decreased.

Also, as shown in FIG. 2, the trailing-side corners E and I are preferably chamfered to be formed in curved surfaces because collision with the disk can be avoided.

As shown by one-dot chain lines in FIG. 3 and FIG. 4, both side ends 25d of the trailing-side ABS 25 are preferably formed in inclined surfaces or curved surfaces so that the width dimension gradually decreases in the direction from the recording medium-facing surface 20 to the trailing-side ABS 25 because collision between the trailing-side corners E and I and the disk can be further avoided.

In the present invention, the protecting layer 34 is formed on the portion of the trailing-side ABS 25 where the upper shield layer 31 and the lower shield layer 30 are exposed, thereby causing no problem of corrosion. Therefore, in the present invention, the width dimensions of the upper shield layer 31 and the lower shield layer 30, which are exposed at the trailing-side ABS 25, may be larger than at least the magnetic functional portion G.

In the magnetic head M2 shown in FIG. 1, the magnetic functional portion G of the magnetic element 22 is formed at the center of the slider S2 in the width direction (the X direction shown in the drawing). However, the magnetic functional portion G may be formed near one of the side ends of the slider S2.

Figure 7:
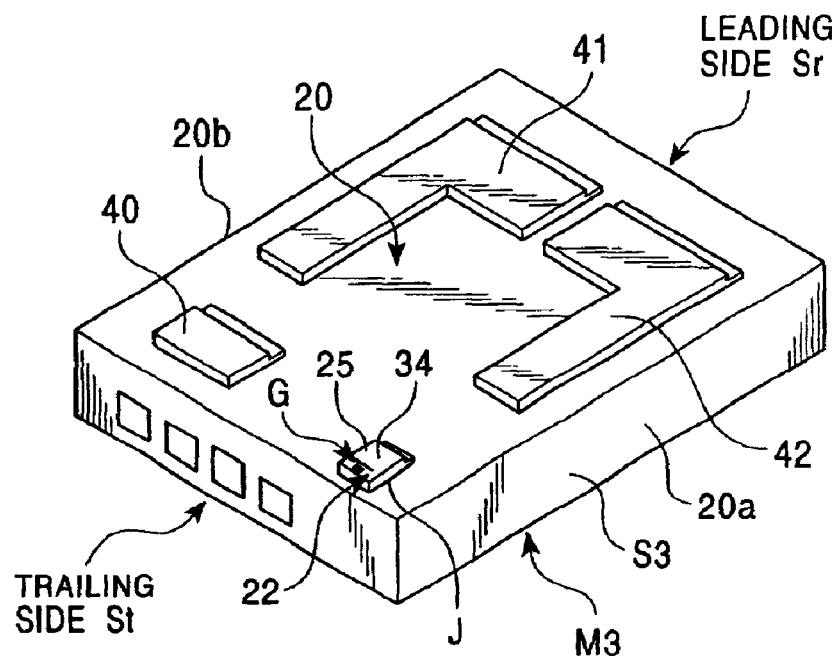
FIG. 7 is a perspective view showing a magnetic head according to a second embodiment of the present invention.

For example, in the magnetic head M3 shown in FIG. 7, the magnetic functional portion G of the magnetic element 22 is formed near one 20a of the side ends of the slider S3, and appears in the trailing-side ABS 15 formed to protrude from the recording medium-facing surface 20. Reference numerals 40, 41 and 42 denote ABSs formed to protrude from the recording medium-facing surface 20.

Figure 10:
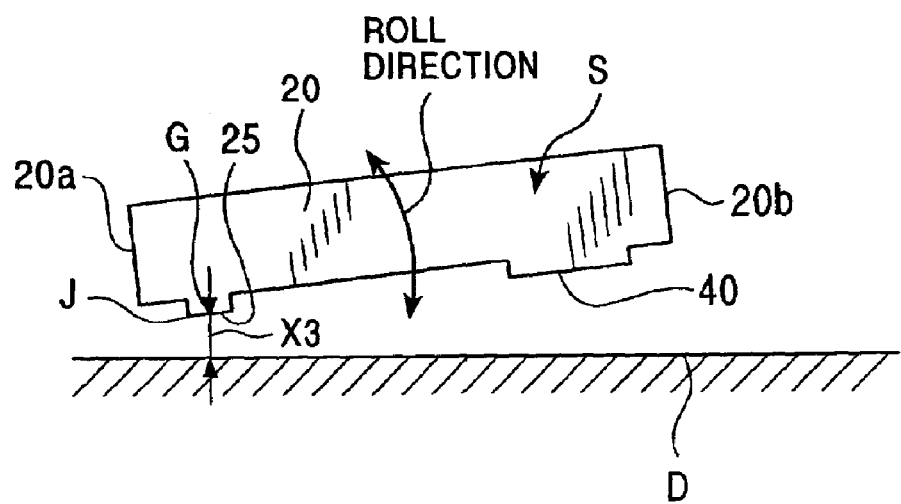
FIG. 10 is a partial front view showing the state in which the magnetic head shown in FIG. 8 flies above a disk D.
Figure 11:
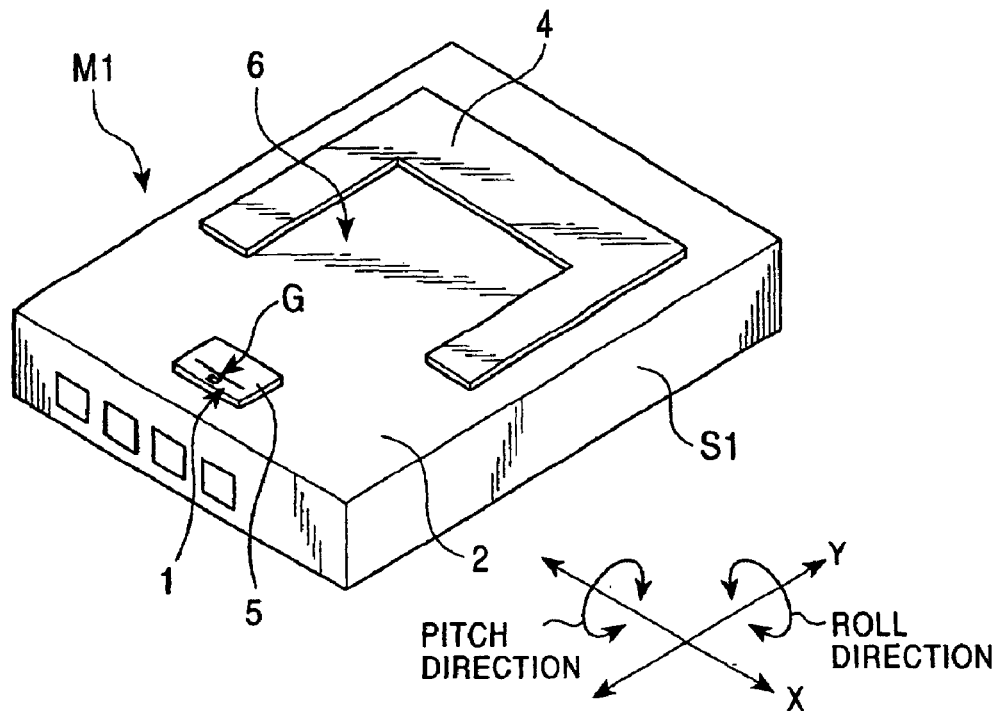
FIG. 11 is a perspective view of a conventional magnetic head.
Figure 12:
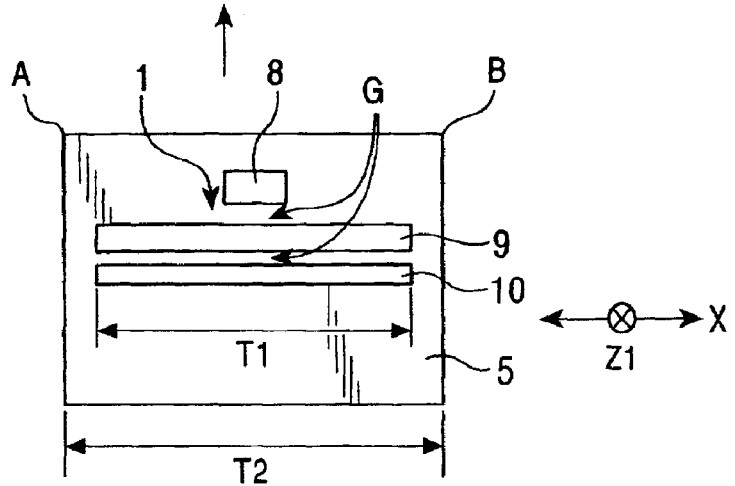
FIG. 12 is an enlarged partial plan view showing only the periphery of the trailing-side ABS shown in FIG. 11.
Figure 13:
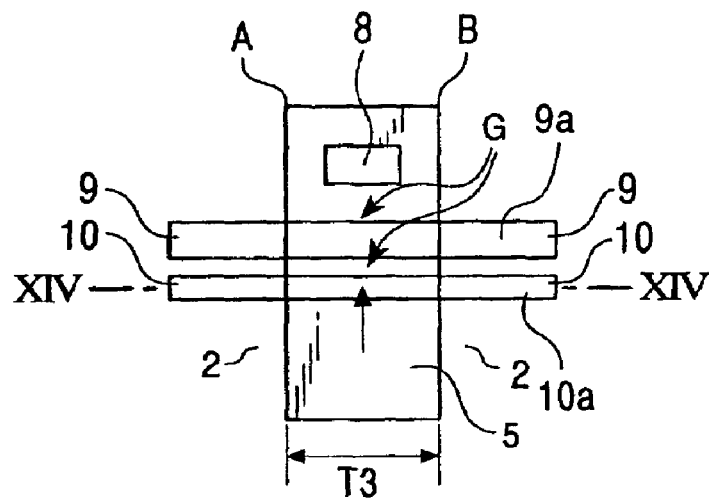
FIG. 13 is an enlarged partial plan view showing the periphery of a trailing-side ABS of another example of a conventional magnetic head.
Figure 14:
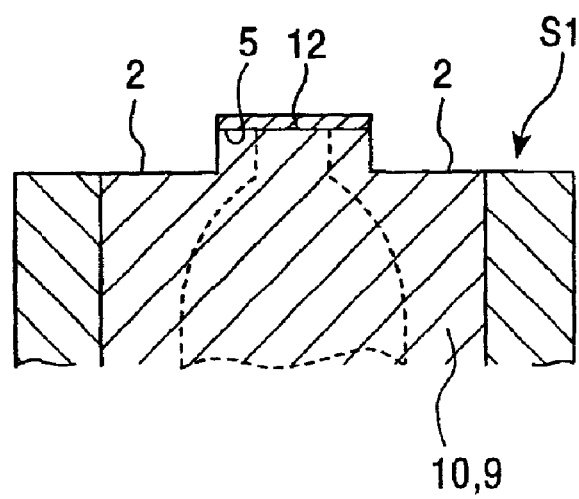
FIG. 14 is a partial sectional view of the slider taken along line XIV—XIV in FIG. 13.
Figure 15:
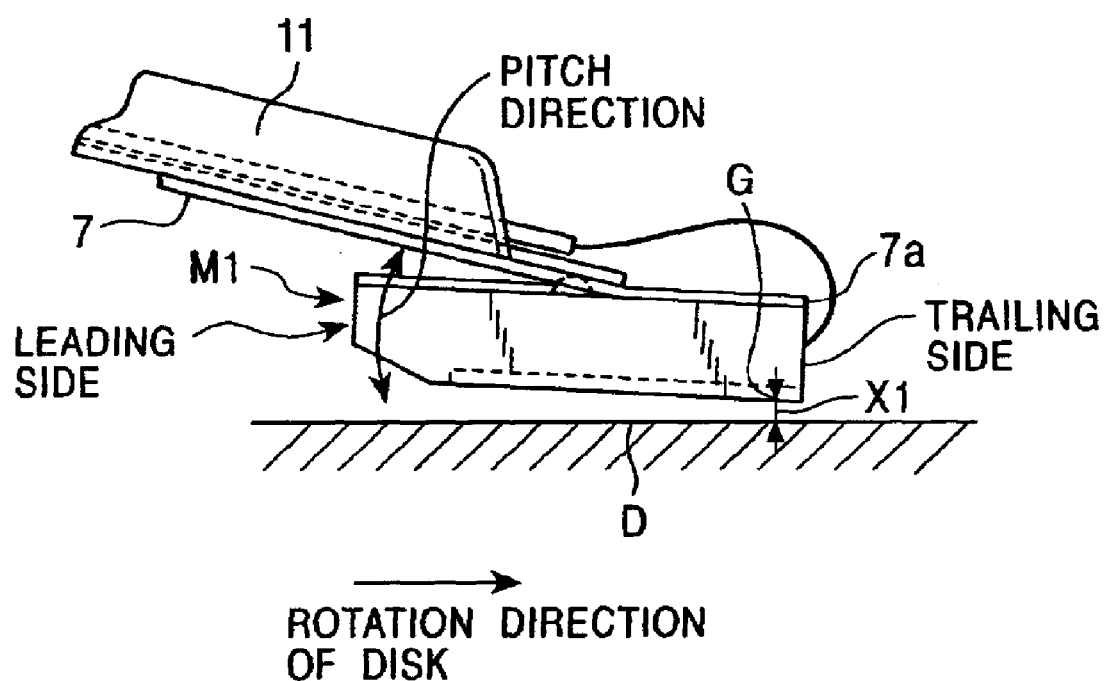
FIG. 15 is a partial side view showing the state in which the magnetic head shown in FIG. 11 flies above a disk D.

In this way, in the side gap-type magnetic head M3 in which the magnetic functional portion G is formed at a position deviating from the center of the slider S3 in the width direction to the one side end 20a, the magnetic head M3 flies above the disk D in the state shown in FIG. 10.

FIG. 10 is a partial front view of the magnetic head M3, as viewed from the trailing side. As shown in FIG. 10, the slider S3 is inclined in the roll direction, and flies in the state in which the side end 20a where the magnetic functional portion G is formed is brought nearer the disk D than the other side end 20b.

In this way, in the side gap-type magnetic head M3 flying at a roll angle, the flying amount X3 between the magnetic functional portion G and the disk D can easily be decreased.

However, when the magnetic head M3 flies at a roll angle, the flying amount between the disk D and the trailing-side corner J of the trailing-side ABS 25 is smallest, which is formed nearer the side end 20a of the slider S3 than the magnetic functional portion G, not between the disk D and the magnetic functional portion G.

Therefore, in the present invention, as described above, the trailing-side ABS 25 in which the magnetic functional portion G appears can be formed in such a small size that the lower shield layer 30 and the upper shield layer 31 constituting the magnetic element 22 protrude from the trailing-side ABS 25 in the width direction, decreasing the distance between the corner J and the magnetic functional portion G. Therefore, the flying amount between the corner J and the disk D is not extremely decreased as compared with the flying amount X3 between the magnetic functional portion G and the disk D, and is substantially the same as the flying amount X3. It is thus possible to manufacture the magnetic head M3 excellent for a higher recording density and causing less collision between the corner J and the disk even when the flying amount X3 between the magnetic functional portion G and the disk is decreased.

In any one of the forms shown in FIGS. 3 to 6, the ends of the upper shield layer 31 and the lower shield layer 30 protrude from the trailing-side ABS 25, and the protruding portions are formed inside the protecting layer 23 at the same height as the recording medium-facing surface 20 which is lower than the trailing-side ABS 25 by a step. However, the step surfaces at the same height as the step surface 28 protruding from the recording medium-facing surface 20 may be formed on the protruding portions, and the outside portions 30a and 31a of the upper shield layer 30 and the lower shield layer 30 may be extended into the protecting layer at the same height as the step surfaces.

Although, in FIG. 2, both ends of the outside portions 30a and 31a of the lower shield layer 30 and the upper shield layer 31 are extended beyond the trailing-side ABS 25, only one of the ends of the outside portions may be extended beyond the trailing-side ABS 25.

The magnetic head device shown in FIG. 8 can be applied to not only the CSS system but also a lamp load system.

The present invention can be applied to not only a magnetic head mounted on a hard disk device but also other magnetic functional devices, for example, such as a recording reproducing device for a magnetic tape, a magnetic sensor, etc.

The present invention can impart versatility to the support of any one of the magnetic functional devices in miniaturization of the support. For example, a tapered shape can be provided, in which the recording medium-facing surface side is tapered. It is also possible to improve corrosion resistance, and prevent a medium from being damaged by a portion of a magnetic element during sliding on a recording medium.

The support does not necessarily comprise an ABS formed to protrude from the recording medium-facing surface 20 shown in FIG. 1, and the shape of the support is not limited to that shown in FIG. 1.

The magnetic element 22 may be a bulk type not comprising a laminate of thin films.

Figure 16:
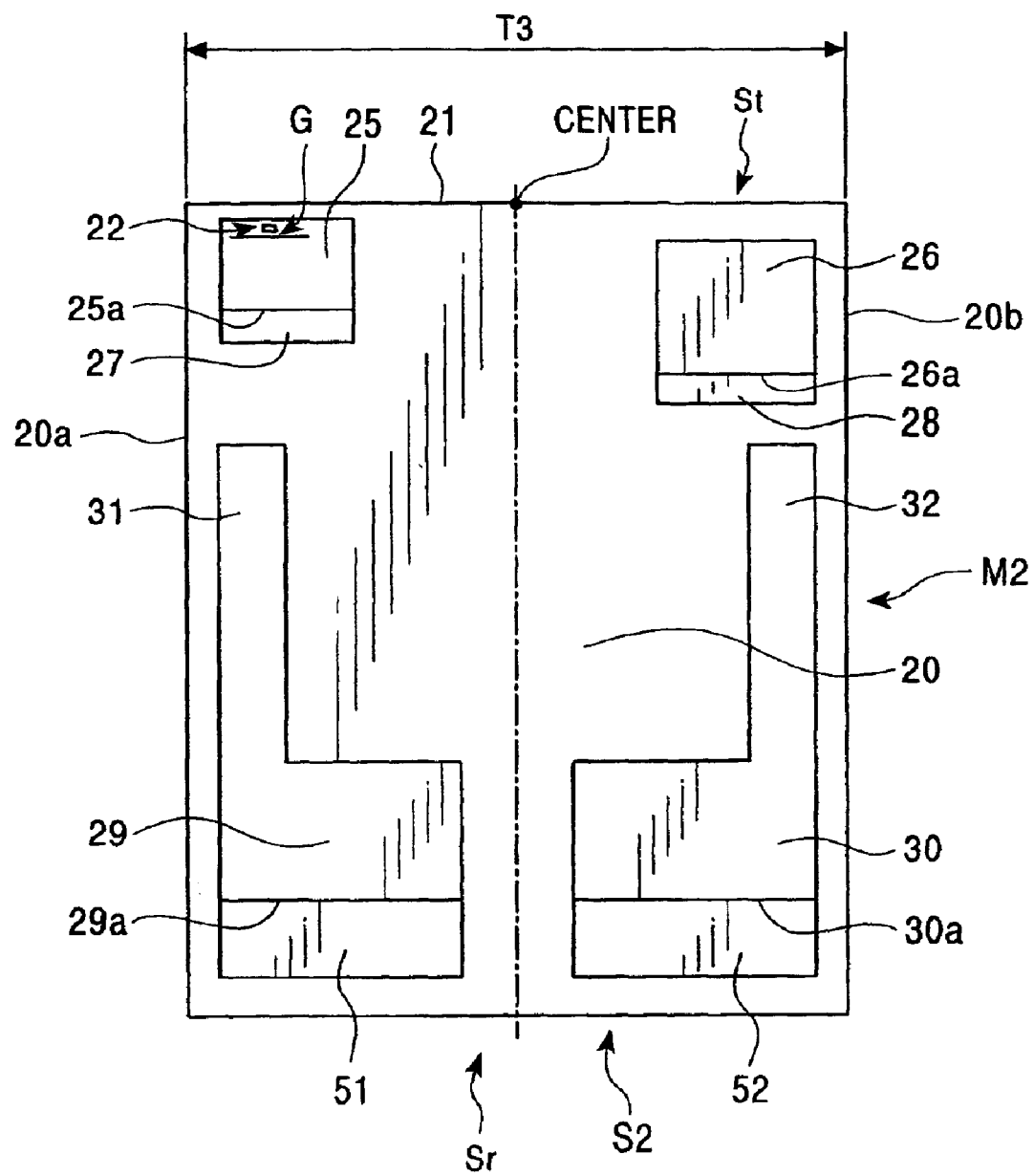
FIG. 16 is a plan view showing a magnetic head according to a third embodiment of the present invention with a recording medium-facing surface turned upward.
Figure 17:
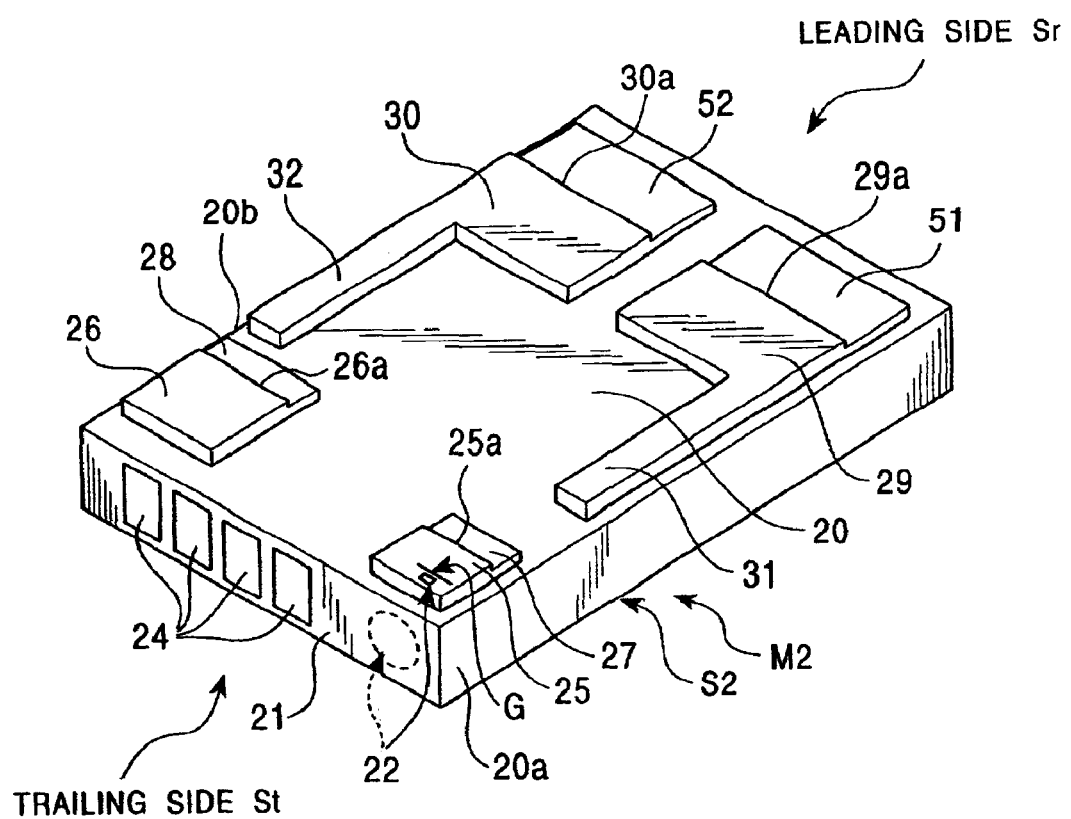
FIG. 17 is a perspective view of the magnetic head shown in FIG. 16.

FIG. 16 is a plan view showing a magnetic head (magnetic functional device) M2 of a magnetic head device according to another embodiment of the present invention with a recording medium-facing surface 20 turned upward. FIG. 17 is a perspective view of the magnetic head shown in FIG. 16, as viewed from the trailing side.

A slider S2 is made of a ceramic material, for example, such as aluminum titanium carbide ($Al_2O_3$—TiC) or the like. The width dimension T3 of the slider S2 in the width direction (the X direction shown in the drawing) is about 1 mm, for example.

As shown in FIG. 16, a magnetic element 22 comprising, for example, a thin film reproducing element serving as a reproducing magnetic functional portion utilizing a magnetoresistive effect, and an inductive thin film recording element serving as a recording magnetic functional portion is provided at the trailing-side end 21 of the slider S2. The magnetic element 22 may comprise only the thin film reproducing element or the thin film recording element.

In the embodiment shown in FIGS. 16 and 17, the magnetic element 22 is formed at a position deviating from the center of the trailing-side end 21 of the slider S2 in the width direction to the left end 20a of the slider S2.

As shown in FIG. 17, terminals 24 are provided at the trailing-side end 21 of the slider S2 to be respectively connected to the thin film reproducing element and the thin film recording element which constitute the magnetic element 22.

As shown in FIG. 16, a trailing-side ABS (ABS) 25 is formed on the tailing side St of the slider S2 near the left side end 20a thereof so as to protrude from the recording medium-facing surface 20 to the recording medium (upward in the drawing).

Furthermore, the magnetic functional portion G of each of the thin film reproducing element and the thin film recording element of the magnetic element 22 appears in the trailing-side ABS 25.

A trailing-side ABS 26 is also formed on the tailing side St of the slider S2 near the right side end 20b thereof so as to protrude from the recording medium-facing surface 20 to the recording medium (upward in the drawing).

In the present invention, as shown in FIGS. 16 and 17, trailing-side step surfaces 27 and 28 lower than the trailing-side ABS 25 by a step are respectively formed between the leading-side end surfaces 25a and 26a of the trailing-side ABSs 25 and 26 and the recording medium-facing surface 20 so as to protrude from the recording medium-facing surface 20.

In the slider S2 shown in FIGS. 16 and 17, leading-side ABSs 29 and 30 having the same height dimension as the trailing-side ABSs 25 and 26 are formed on the leading side Sr so as to protrude from the recording medium-facing surface 20.

Also, two rail surfaces 31 and 32 are formed to extend from the leading-side ends of the leading-side ABSs 29 and 30 to the trailing side St and protrude from the recording medium-facing surface 20.

Furthermore, leading-side step surfaces 51 and 52 lower than the leading-side ABSs 29 and 30 by a step are formed between the leading-side ends 29a and 30a of the leading-side ABSs 29 and 30 and the recording medium-facing surface 20 to protrude from the recording medium-facing surface 20.

Figure 29:
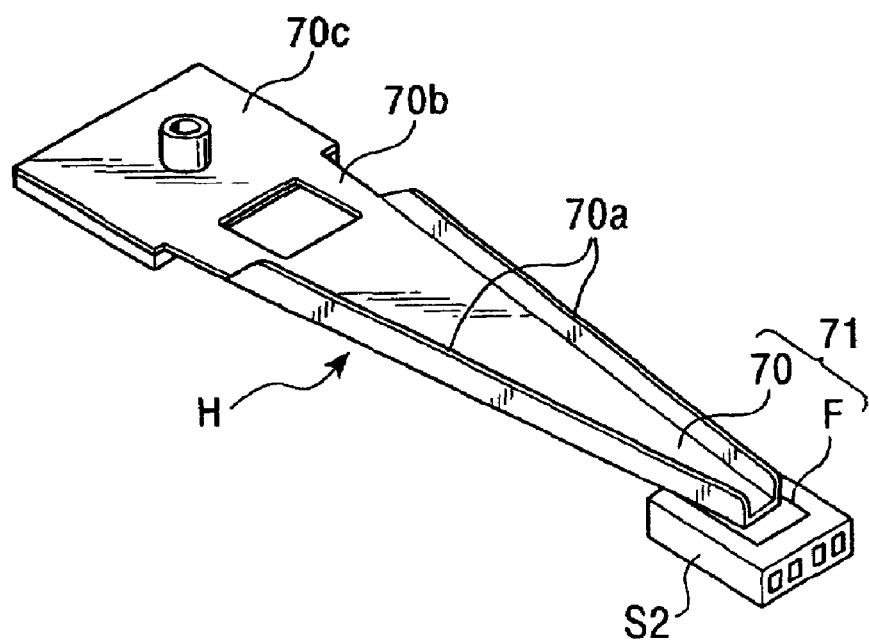
FIG. 29 is a perspective view of a magnetic head device according to an embodiment of the present invention.
Figure 30:
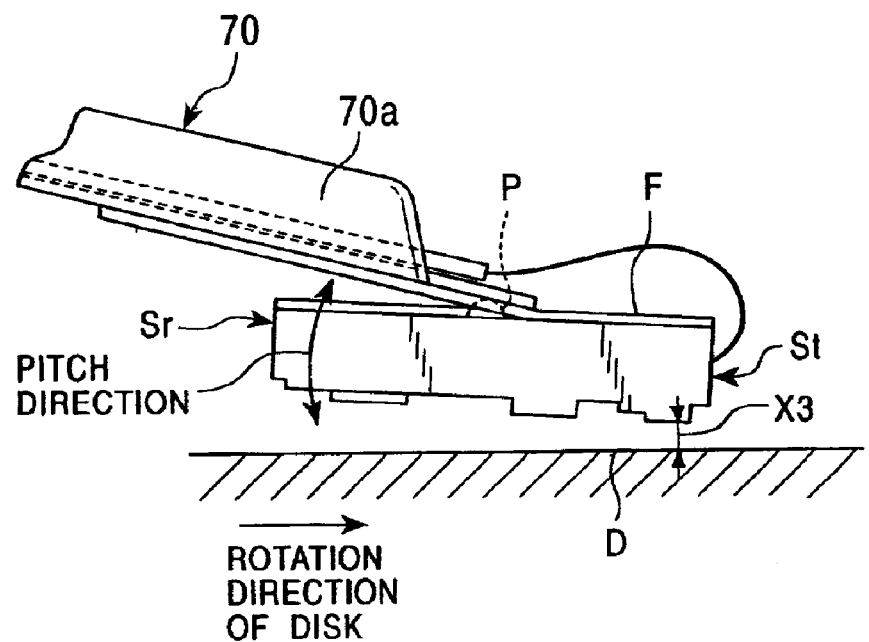
FIG. 30 is a partial side view showing the state in which the magnetic head shown in FIG. 16 flies above a disk D.
Figure 31:
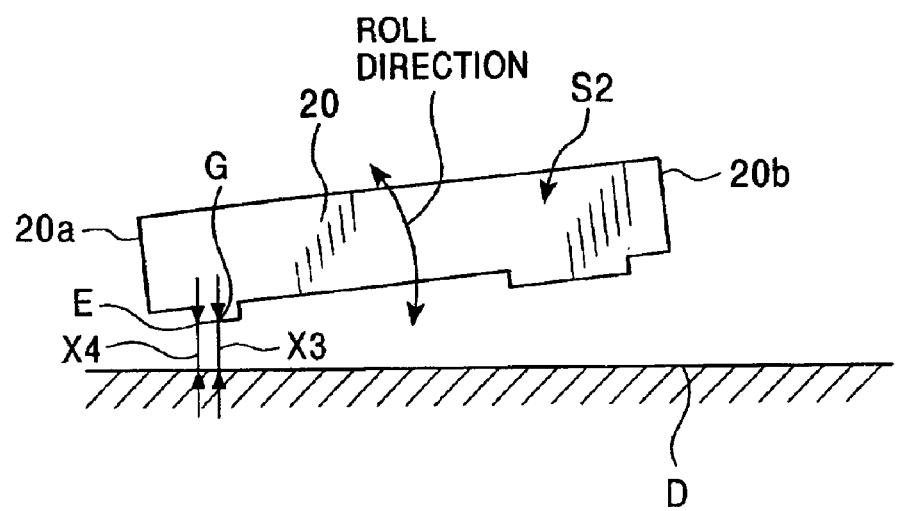
FIG. 31 is a partial front view showing the state in which the magnetic head shown in FIG. 16 flies above a disk D.
Figure 32:
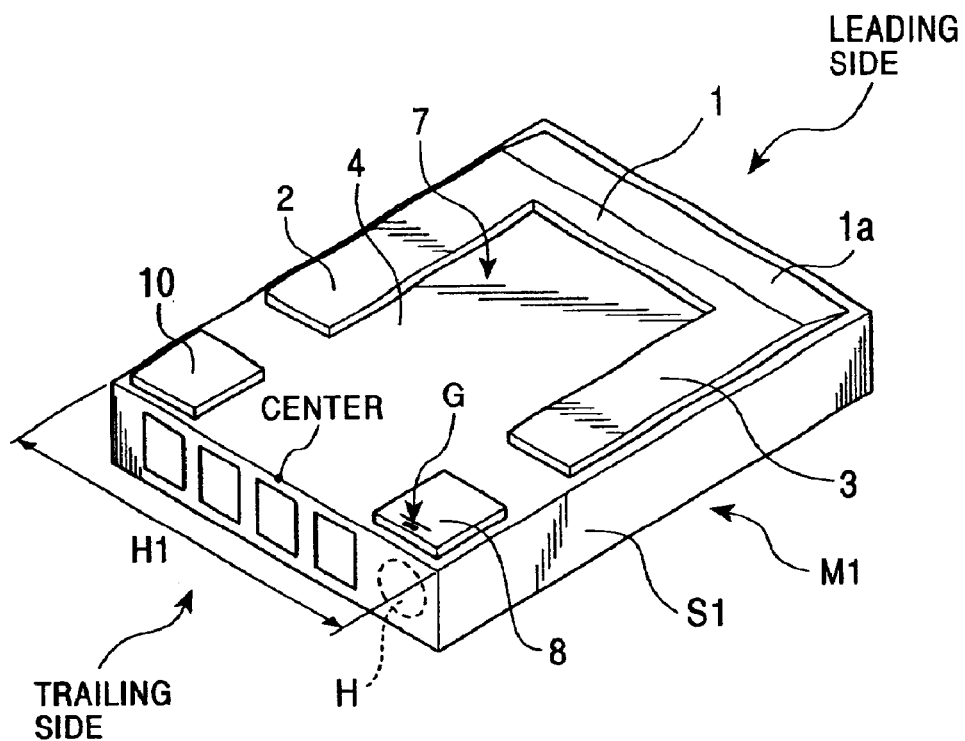
FIG. 32 is a perspective view of a conventional magnetic head.

FIG. 29 is a perspective view of a magnetic head device H provided with the magnetic head M2 shown in FIG. 16, and FIG. 30 is a partial side view showing the state in which the magnetic head M2 flies above a disk D.

As shown in FIG. 29, a supporting member 71 for supporting the magnetic head M2 comprises a load beam 70 comprising a leaf spring, and a flexure (elastic supporting member) F comprising a thin leaf spring provided at the tip of the load beam 70.

As shown in FIG. 29, the load beam 70 has a structure in which flexural portions 70a having rigidity are formed on both sides of the load beam 70, and the base end 70b of the load beam 70 where the flexural portions 70 are not formed can exhibit predetermined elastic pressure. Also, a mount portion 70c is provided on the base end 70b of the load beam 70 so that the mount portion 70c is mounted on a mounting surface of the disk device to provide the magnetic head device H in the disk device.

As shown in FIGS. 29 and 30, the magnetic head M2 is bonded to the lower surface of the flexure F from the side opposite to the recording medium-facing surface 20. As shown in FIG. 30, a spherical pivot P is formed on the flexure F to project upward, and the top of the pivot P contacts the load beam 70.

The magnetic head M2 is urged toward the recording surface of the disk D with a weak elastic force by the supporting member 71. In a CSS system, the magnetic head M2 is in contact with the disk D at the start, and a flying force acts on the magnetic head M2 by an air flow produced on the surface of the disk D at the same time as the start of the disk D. As a result, the magnetic head M2 flies in an inclined state in which the leading side Sr is raised from the disk, and scans the surface of the disk D in a state in which the trailing side St of the magnetic head M2 slightly flies above the disk D.

When the disk D is rotated to move the air flow from the leading side Sr of the magnetic head M2 to the trailing side St thereof, positive pressure is produced on each of the ABSs 25, 26, 29 and 30, and the rail surfaces 31 and 32, and negative pressure is produced on the recording medium-facing surface 20 between the rail surfaces 31 and 32.

As shown in FIG. 30, when the magnetic head M2 flies above the disk D, the flying amount of the magnetic functional portion G of the magnetic element 22 above the disk D is X3.

The magnetic head M2 of the present invention is a side gap-type magnetic head in which the magnetic functional portion G is formed near one of the side ends of the slider S2 in the width direction (the X direction shown in the drawing).

In the side gap-type magnetic head, in order to decrease the flying amount X3 between the magnetic functional portion G and the disk D, the magnetic head M2 is inclined in the roll direction to bring the left end 20a where the magnetic functional portion G is formed nearer the disk D than the right end 20b.

In the present invention, in order to appropriately decrease the flying amount X3 between the magnetic functional portion G and the disk D, the formation position of the magnetic functional portion G is designed as follows.

Figure 18:
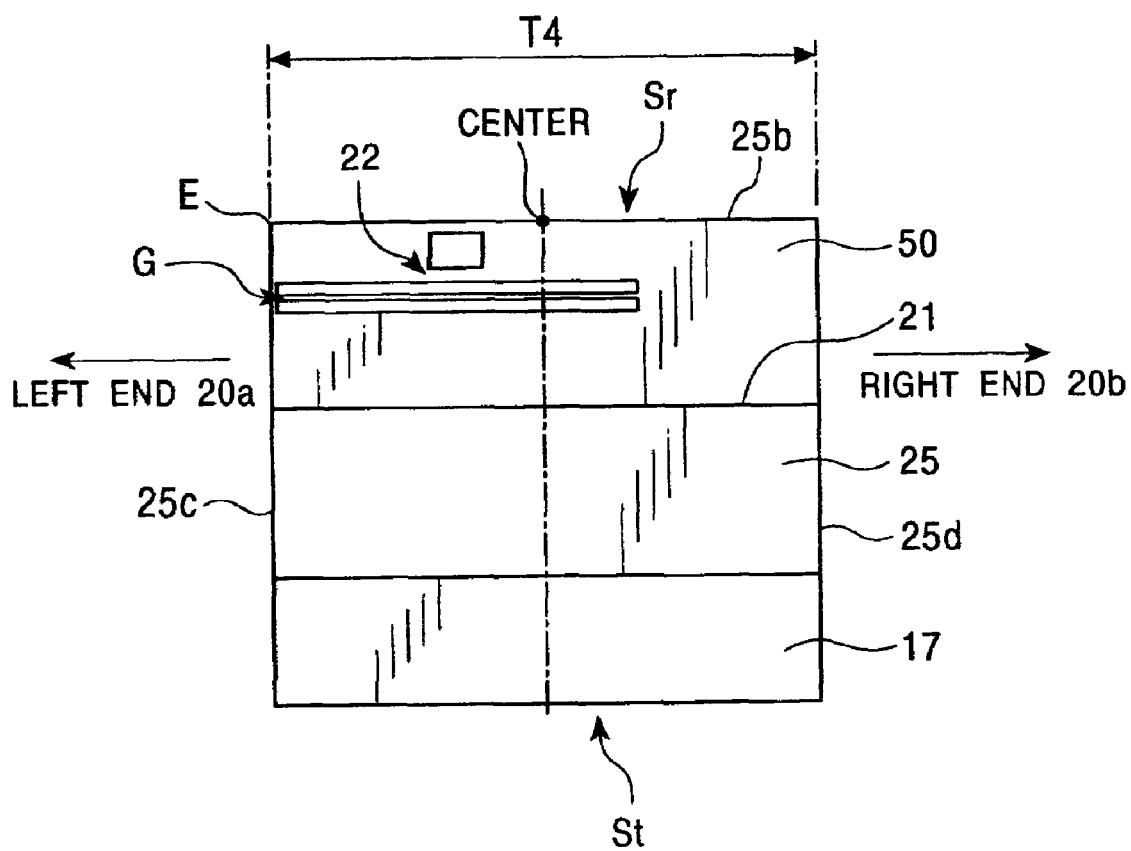
FIG. 18 is an enlarged partial plan view showing only the periphery of a trailing-side ABS according to the present invention.

FIG. 18 is an enlarged partial plan view showing only the trailing-side ABS 25 shown in FIG. 16.

In the present invention, as shown in FIG. 18, the magnetic functional portion G is formed at a position deviating from the center of the maximum width dimension T4 of the trailing-side ABS 25 to the left end 20a of the slider S2.

Figure 33:
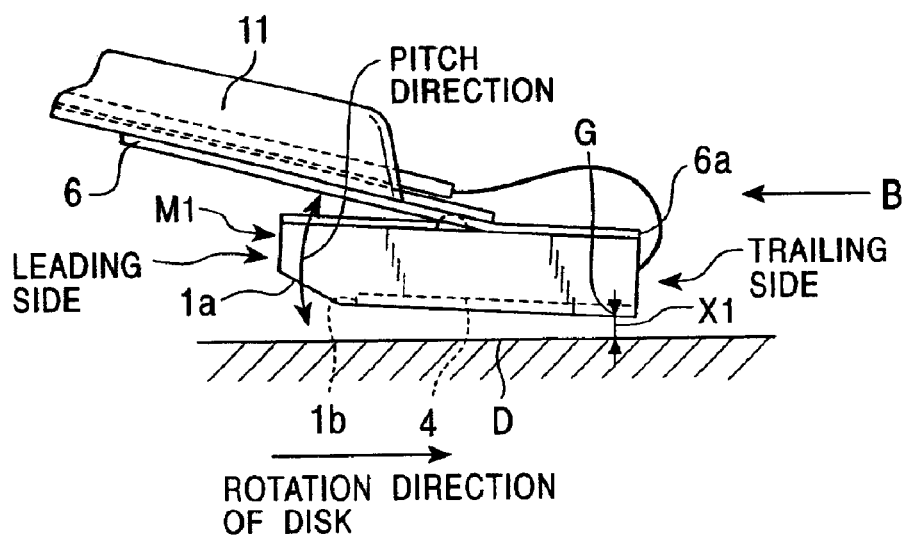
FIG. 33 is a partial side view showing the state in which the magnetic head shown in FIG. 32 flies above a disk D.
Figure 34:
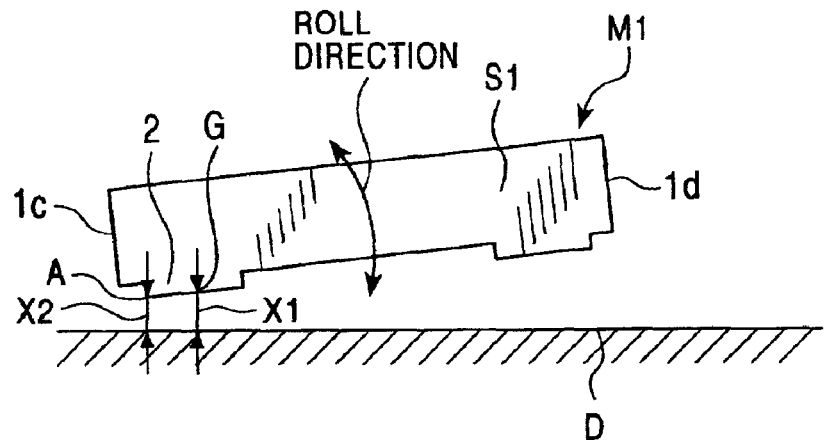
FIG. 34 is a partial front view showing the state in which the magnetic head shown in FIG. 32 flies above a disk D.
Figure 35:
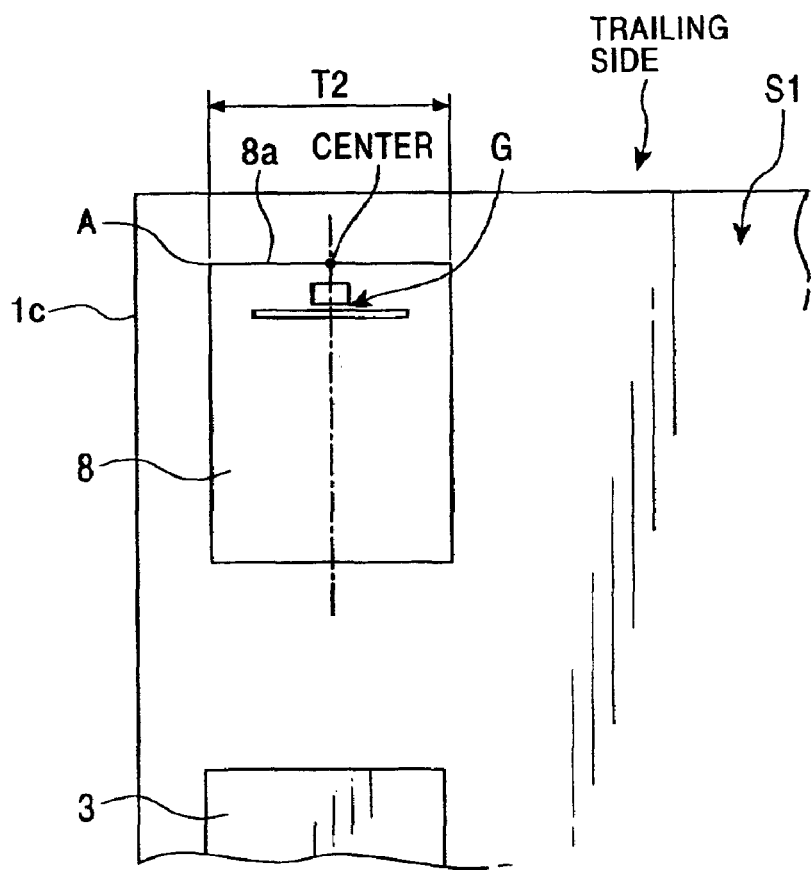
FIG. 35 is an enlarged partial view of a conventional magnetic head.

Therefore, when the magnetic head M2 flies in the state in which the trailing-side end of the slider S2 is brought nearer the disk surface than the leading-side end at a pitch angle as shown in FIG. 33, and the left side end 20a of the slider S2 is brought nearer the disk D than the right side end 20b at a roll angle as shown in FIG. 34, the magnetic functional portion G can be brought near the trailing-side corner E of the trailing-side ABS 25, which is brought nearest the disk surface. Thus, the flying amount X3 between the magnetic functional portion G and the disk D can be appropriately decreased, as compared with a conventional magnetic head.

When the magnetic functional portion G is brought near the trailing-side corner E of the trailing-side ABS 25, the difference between the flying amount X4 between the trailing-side corner E and the disk D and the flying amount X3 between the magnetic functional portion G and the disk D can be decreased (refer to FIG. 3), thereby avoiding the danger of collision between the corner E and the disk D.

Therefore, the present invention can produce a magnetic head excellent for a higher recording density in which the flying amount X3 between the magnetic functional portion G and the disk D can be appropriately decreased, and damage to the magnetic head M2 and the disk D can be appropriately avoided, and a magnetic head device H comprising the magnetic head M2.

Also, like in the present invention, the magnetic functional portion G is brought near the trailing-side corner E to eliminate the need to consider the flying amount X4 between the corner E and the disk D in controlling the roll angle, as compared with a conventional magnetic head. It is thus possible to control the roll angle in consideration of only the flying amount X3 between the magnetic functional portion G and the disk D, thereby simplifying control of the roll angle.

Furthermore, in the present invention, only the position of the magnetic functional portion G is changed without a change in surface area of the trailing-side ABS 25, and like in a conventional magnetic head, appropriate positive pressure is thus produced on the trailing-side ABS 25 to eliminate the need to change the design of the slider S2. Also, the surface area of the trailing-side ABS 25 can be maintained at a sufficient value, thereby manufacturing the magnetic head M2 causing less wearing with the disk surface during CSS driving.

Figure 19:
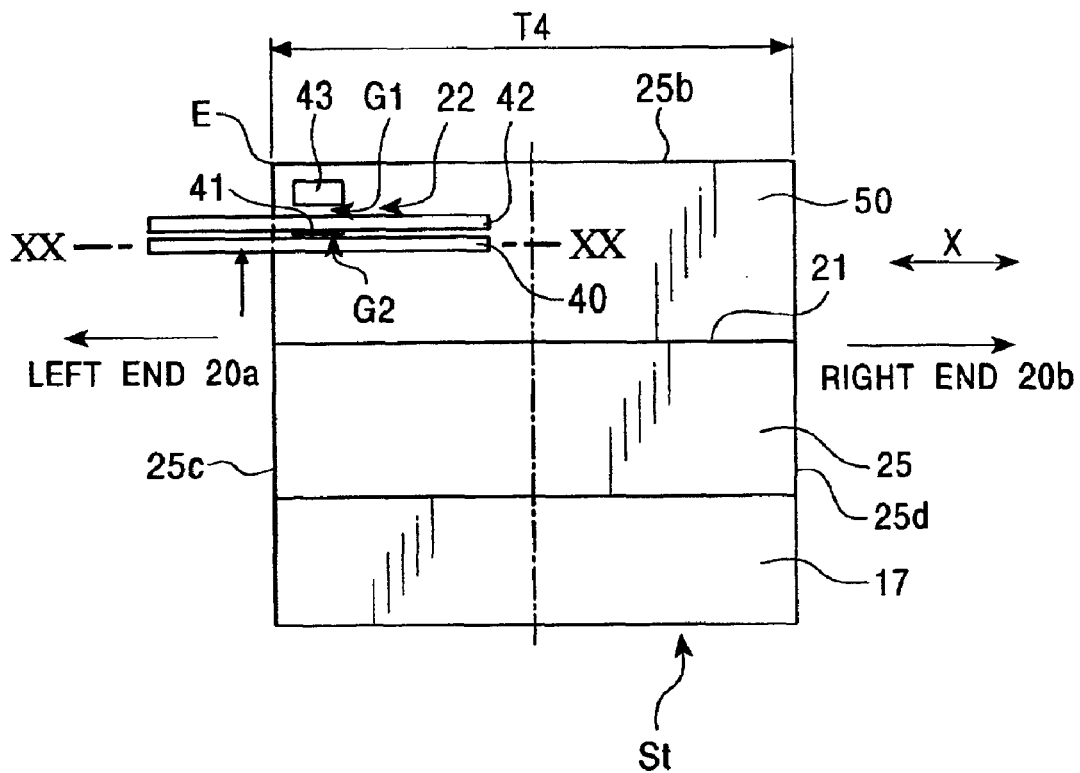
FIG. 19 is an enlarged partial plan view showing only a trailing-side ABS according to a fourth embodiment of the present invention.

FIG. 19 is an enlarged partial view showing the trailing-side ABS 25 according to still another embodiment of the present invention.

Like in FIG. 18, in FIG. 19, the maximum width dimension of the trailing-side ABS 25 is X4, and the magnetic functional portion G is formed at a position deviating from the center of the maximum width dimension T4 of the trailing-side ABS 25 to the left end 20a of the slider S2.

A thin film reproducing element of the magnetic element 22 comprises a lower shield layer 40 having a predetermined width, and an upper shield layer 42, which appear in the trailing-side ABS 25. Both the lower shield layer 40 and the upper shield layer 42 are magnetic layers made of a magnetic material such as a NiFe alloy, or the like. Also, a magnetic sensor part 41 comprising an AMR element using an anisotropic magnetoresistive effect, a GMR element using a giant magnetoresistive effect, or a TMR element using a tunneling magnetoresistive effect is formed between the lower shield layer 40 and the upper shield layer 42 to appear in the trailing-side ABS 25. The magnetic sensor part 41 constitutes the magnetic functional portion G2, and a gap is formed between the lower shield layer 40 and the magnetic sensor part 41, and between the magnetic sensor part 41 and the upper shield layer 42.

On the other hand, in a thin film recording element, the upper shield layer 42 is also used as a lower core layer, and an upper core layer 43 having a width smaller than the lower core layer 42 appears in the trailing-side ABS 25. Also, a coil layer is formed so as not to appear in the trailing-side ABS 25, for inducing a recording magnetic field in each of the core layers. The portion between the lower core layer 41 and the upper core layer 43 constitutes the magnetic functional portion G1.

In this embodiment, as shown in FIG. 19, the upper shield layer (lower core layer) 42 and the lower shield layer 40 are formed to protrude from the magnetic functional portions G1 and G2 in the width direction (the X direction) of the slider S2, and the magnetic functional portions G1 and G2 are positioned in an intermediate portion of the magnetic element 22 in the track width direction. The upper shield layer 42 and the lower shield layer 40 are formed to further protrude from the left end 25c of the trailing-side ABS 25 toward the left end 20a of the slider S2.

Therefore, the magnetic functional portion G can be brought near the trailing-side corner E which is brought nearest the disk surface when the magnetic head M2 flies. In this embodiment, it is possible to further decrease the flying amount X3 between the magnetic functional portion G and the disk surface, and avoid collision between the trailing-side corner E and the disk surface, thereby producing the magnetic head M2 excellent for a higher recording density, and the magnetic head device H comprising the magnetic head M2.

Figure 20:
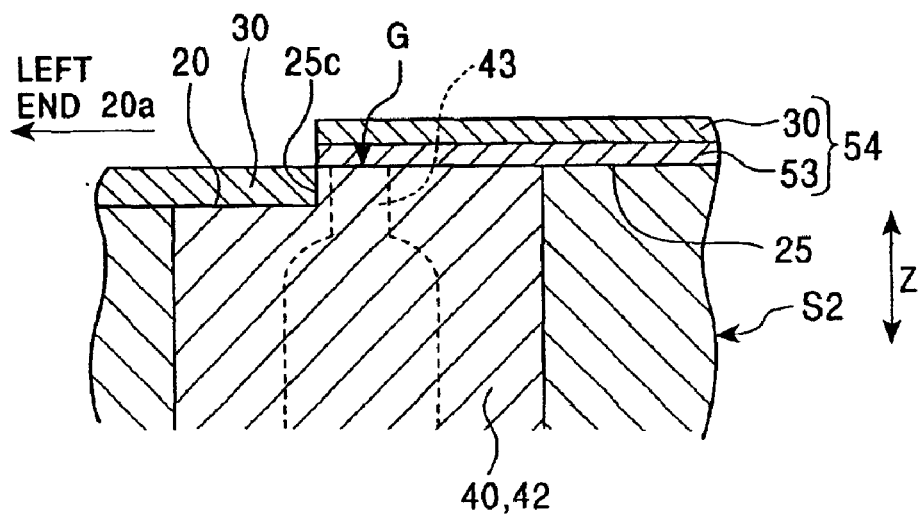
FIG. 20 is a partial sectional view of the magnetic head shown in FIG. 19 taken along line XX—XX in FIG. 19, as viewed from the direction of an arrow.

FIG. 20 is a partial sectional view showing the slider S2 taken along line XX—XX in FIG. 19, as viewed from the direction of an arrow.

As shown in FIG. 20, the portion formed to protrude from the left end 25c of the trailing-side ABS 25 toward the left end 20a of the slider S2 is formed to retreat from the magnetic functional portion G in the direction (the Z direction shown in the drawing) away from the disk, and the portions of the upper shield layer (lower core layer) 42 and the lower shield layer 40, which protrude from the trailing-side ABS 25, are exposed at a step (left side end) 25c at the edge of the trailing-side ABS 25 and the portion of the recording medium-facing surface 20, which retreats from the trailing-side ABS 25 in the Z direction through the step 25c.

However, the magnetic material layers exposed at the recording medium-facing surface 20 are exposed directly to the outside air and to the various solvents used in the manufacturing process, thereby causing corrosion of the exposed upper shield layer 42 and lower shield layer 40 made of a magnetic material. Therefore, recording and reproducing characteristics undesirably deteriorate.

Therefore, in the present invention, as shown in FIG. 20, a protecting layer 30 made of diamond-like carbon (DLC) is preferably provided on the surfaces of the exposed upper shield layer 42 and lower shield layer 40. The thickness of the protecting layer 30 is preferably sufficient for completely covering the step 25c because the upper shield layer 42 and the lower shield layer 40, which are exposed at the step 25c, can be protected to further improve corrosion resistance.

Similarly, a protecting layer 54 made of the diamond-like carbon is also preferably provided on the surface of the trailing-side ABS 25 because the corrosion can be prevented, and damage to the disk D in sliding can be decreased. However, the protecting layer 54 formed on the surface of the trailing-side ABS 25 has a laminated structure comprising protecting layers 30 and 53.

Figure 26:
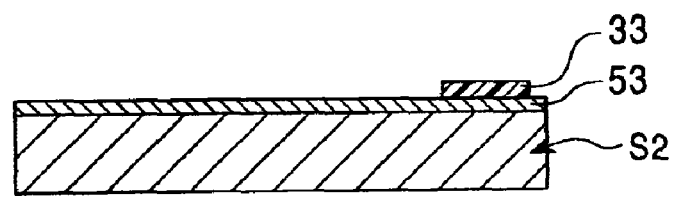
FIG. 26 is a drawing showing a step for manufacturing a magnetic head.
Figure 27:
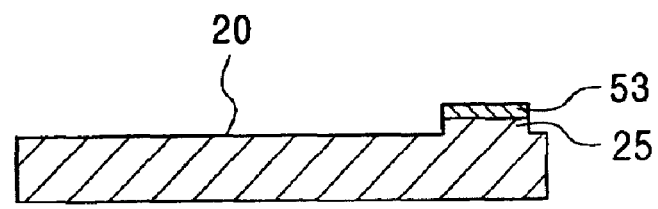
FIG. 27 is a drawing showing a step after the step shown in FIG. 26.
Figure 28:
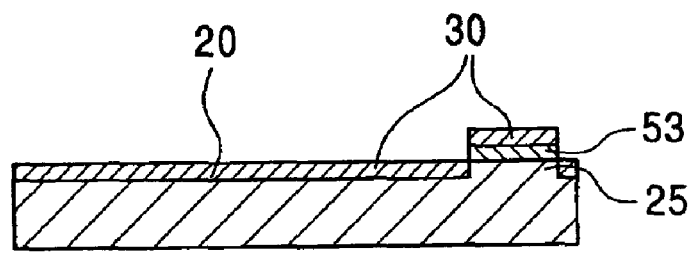
FIG. 28 is a drawing showing a step after the step shown in FIG. 27.

This laminated structure can be formed as follows. First, as shown in FIG. 26, the protecting layer 53 is formed over the entire surface of the slider S2, and then a resist 33 is coated on the trailing-side ABS 25 and the other ABSs. Then, a portion of the protecting layer 53 and a portion of the slider S2, which are not coated with the resist 33, are etched off to form the recording medium-facing surface 20 and the step surface which are lower than the trailing-side ABS 25 (refer to the step shown in FIG. 27). Then, as shown in FIG. 28, the protecting layer 30 is formed over the entire surface including the recording medium-facing surface 20 and the ABSs. Therefore, the protecting layer 53 is first formed on the trailing-side ABS 25, and then the protecting layer 30 is formed on the protecting layer 53.

Figure 21:
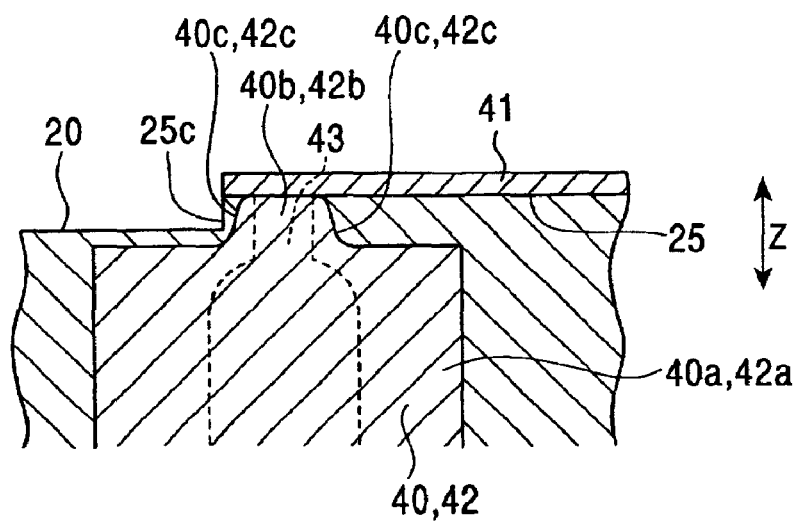
FIG. 21 a partial sectional view of a magnetic head according to a fifth embodiment of the present invention.

Alternatively, as shown in FIG. 21, the portions of the upper shield layer 42 and the lower shield layer 40, which protrude from the trailing-side ABS 25 toward the left end 20a of the slider, are preferably buried so as not to appear in the step 25c at the edge of the trailing-side ABS 25 and the recording medium-facing surface 20 retreating from the trailing-side ABS 25 in the Z direction through the step 25C.

As shown in FIG. 21, for example, the upper shield layer 42 and the lower shield layer 40 respectively comprise rear wide regions 42a and 40a, and front regions 42b and 40b which protrude from the rear regions to the trailing-side ABS 25 and are narrower than the rear regions 42a and 40a. The front end surfaces of the front regions 42b and 40b are exposed at the trailing-side ABS 25, and both side ends 40c and 42c of the front regions 40b and 42b are formed in inclined surfaces or curved surfaces so that the width dimension gradually increases in the direction to the rear regions 40a and 42a.

The above-described shape can appropriately prevent the portions of the lower shield layer 40 and the upper shield layer 42, which protrude from the trailing-side ABS 25, from being exposed at the recording medium-facing surface 20.

In the case shown in FIG. 21, unlike in FIG. 20, the protecting layer 30 need not be provided on the recording medium-facing surface 20, thereby simplifying the manufacturing process.

The magnetic element 22 shown in FIGS. 18 and 19 is provided at the trailing-side end 21 of the slider S2, and thus a protecting layer 50 made of a nonmagnetic material is preferably provided on the trailing-side end 21 to cover the magnetic element 22.

By providing the protecting layer 50, the magnetic element 22 can be prevented from being exposed directly to the outside air and various solvents used in the process for manufacturing the magnetic head, thereby preventing corrosion of the magnetic element 22.

As shown in FIG. 18 and 19, when the magnetic element 22 is coated with the protecting layer 50, the trailing-side ABS 25 and the steps 25c and 25d at the edges of the trailing-side ABS 25 are formed to extend from the slider S2 to the protecting layer 50. In the case shown in FIG. 20, the portions of the lower shield layer 40 and the upper shield layer 42, which protrude from the trailing-side ABS 25, are formed to be coplanar with the surface of the protecting layer 50 (coplanar with the recording medium-facing surface 20).

In the case shown in FIG. 21, the portions of the lower shield layer 40 and the upper shield layer 42, which protrude from the trailing-side ABS 25, are buried in the protecting layer 50.

Figure 22:
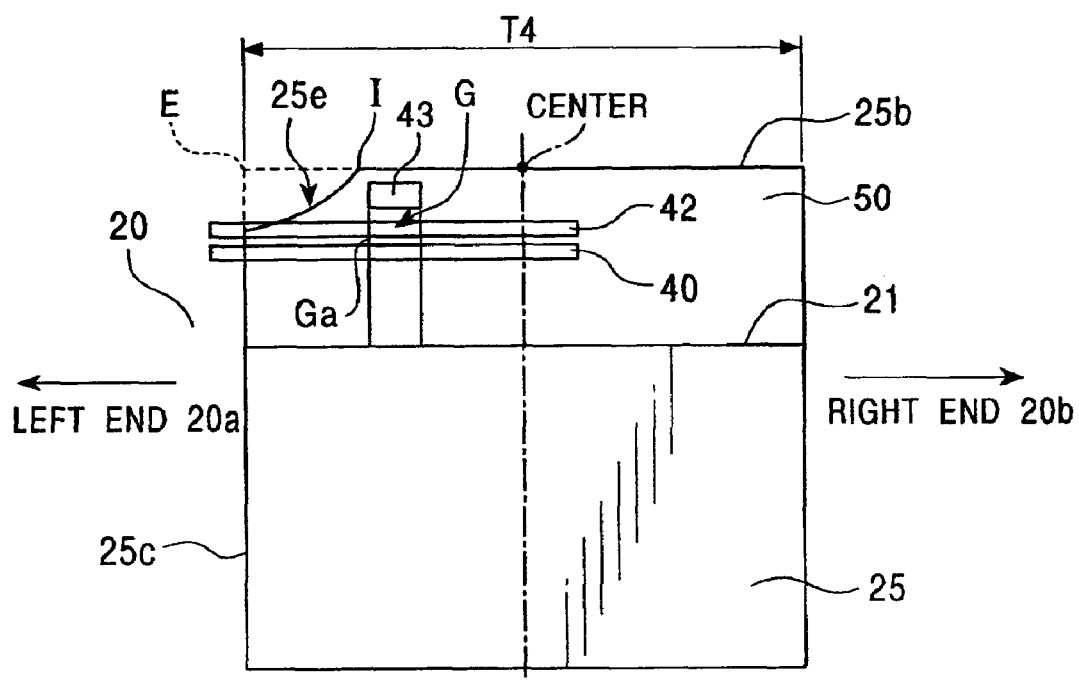
FIG. 22 is an enlarged partial plan view showing only a trailing-side ABS according to a sixth embodiment of the present invention.

FIG. 22 is an enlarged partial plane view showing only the trailing-side ABS 25 of a magnetic head according to a further embodiment of the present invention.

In the embodiment shown in FIG. 22, a notch 25e is provided in a concave shape extending to the left end 25c of the trailing-side ABS 25 and the center of the trailing-side ABS 25.

The surface height of the portion of the slider in which the notch 25e is formed may be intermediate between the recording medium-facing surface 20 and the trailing-side ABS 25, and for example, in FIG. 22, the surface height of the portion of the slider in which the notch 25e is formed is the same as the recording medium-facing surface 20.

As shown in FIG. 22, by providing the notch 25e between the left end 25c of the trailing-side ABS 25 and the trailing-side edge 25b, the boundary I between the trailing-side edge 25c and the notch 25e is brought nearest the disk D when the magnetic head M2 flies in the state in which the left end 20a of the slider S2 is brought nearer the disk than the right end 20b at a roll angle. At the same time, the boundary I is brought nearer the magnetic functional portion G than the trailing-side left corner E which is present before the notch 25e is formed.

In the present invention, the magnetic functional portion G is formed at a position deviating from the center of the maximum width dimension T4 of the trailing-side ABS 25 to the left end 20a of the slider S2.

Furthermore, in the present invention, the end Ga of the magnetic functional portion G in the track width direction is positioned nearer the center than the boundary I.

Therefore, in the present invention, the magnetic functional portion G can be formed near the trailing-side edge 25b of the trailing-side ABS 25, and the magnetic functional portion G is brought near the boundary I. Thus, when the magnetic head flies at both the roll angle and the pitch angle, spacing losses can be decreased in both the roll direction and the pitch direction.

Also, in the present invention, by bringing the magnetic functional portion G near the boundary I, the flying amount between the boundary I and the disk D need not be considered in controlling the roll angle, unlike a conventional magnetic head. Therefore, the roll angle can be controlled in consideration of only the flying amount between the magnetic functional portion G and the disk D, thereby simplifying control of the roll angle.

Although, in the present invention, the surface area of the trailing-side ABS 25 is slightly decreased by forming the notch 25e, the notch 25e is formed in a portion of the trailing-side edge 25b of the trailing-side ABS 25 without decreasing the entire surface of the trailing-side ABS 25. Therefore, the surface area of the trailing-side ABS 25 can be maintained at a sufficient value to produce appropriate positive pressure on the trailing-side ABS 25, like in a conventional magnetic head. Also, a magnetic head causing less wearing with the disk surface during CSS driving can be manufactured.

When the upper shield layer 42 and the lower shield layer 40 are partially removed by forming the notch 25e to partially protrude the upper shield layer 42 and the lower shield layer 40 from the trailing-side ABS 25, preferably, the protecting layer 30 is formed on the protruding portions of the upper shield layer 42 and the lower shield layer 40 as shown in FIG. 20, or the shapes of the upper shield layer 42 and the lower shield layer 40 are devised so as to avoid the upper shield layer 42 and the lower shield layer 40 from being exposed at the slider surface, as shown in FIG. 21.

Figure 23:
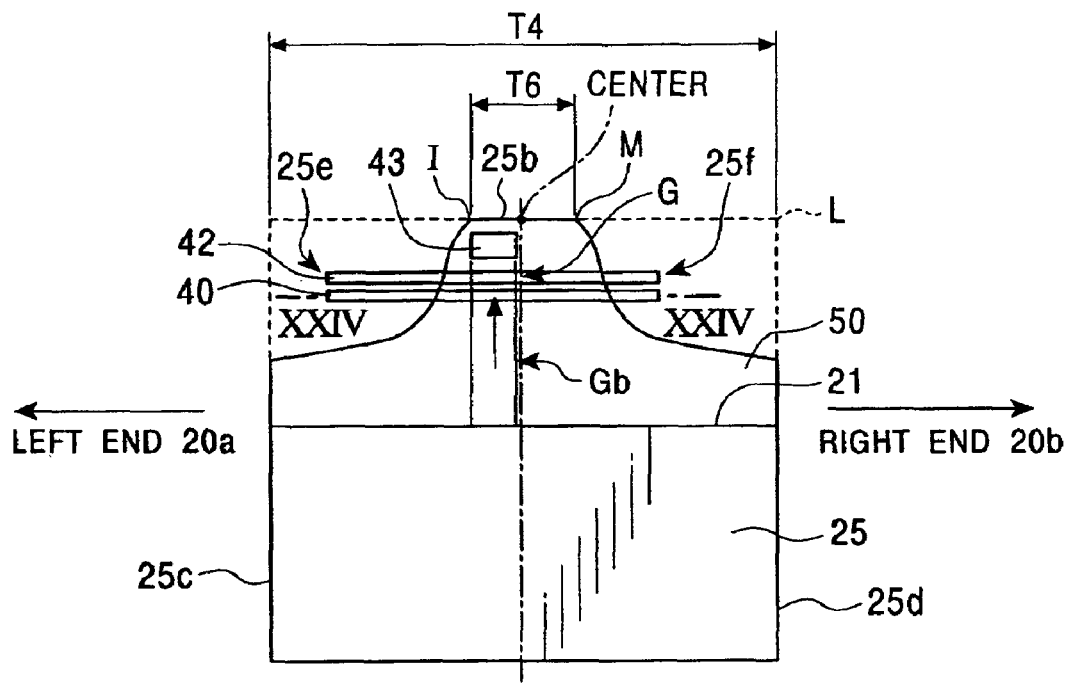
FIG. 23 is an enlarged partial plan view showing only a trailing-side ABS according to a seventh embodiment of the present invention.

Like in FIG. 22, in FIG. 23, a notch 25e is formed between the left end 25c of the trailing-side ABS 25 and the trailing-side edge 25b. However, a concave notch 25f is also formed to extend from the right end 25d of the trailing-side ABS 25 to the center of the trailing-side ABS 25. The end Gb of the magnetic functional portion G in the track width direction is positioned nearer the center of the maximum width dimension of the trailing-side ABS 25 than the boundary M between the notch 25f and the trailing-side edge 25b of the trailing-side ABD 25.

In the present invention, the magnetic head is a side gap-type magnetic head in which the magnetic functional portion G is formed near the left side end 20a of the slider S2. However, the embodiment shown in FIG. 23 is particularly effective for the case in which the magnetic functional portion G is formed at a position near the center (refer to FIG. 16) of the width dimension T3 of the trailing-side end 21 of the slider S2.

With the magnetic functional portion G formed at a position near the center (refer to FIG. 16) of the width dimension T3 of the trailing-side end 21 of the slider S2, even when the magnetic functional portion G is formed near the left end 20a of the slider S2, the trailing-side corner L at the right edge 25d of the trailing-side ABS 25 collides with the disk D when the magnetic head M2 swings in the roll direction during scanning on the disk D.

Therefore, in FIG. 23, the notch 25e is formed between the left end 25c of the trailing-side ABS 25 and the trailing-side edge 25b, and the notch 25f is also formed between the right end 25d of the trailing-side ABS 25 and the trailing-side edge 25b.

Consequently, the right corner of the trailing-side edge 25b of the trailing-side ABS 25 is moved from position L to position M to be brought near the magnetic functional portion G. Therefore, even when the flying amount X3 between the magnetic functional portion G and the disk D is decreased, not only the boundary I between the trailing-side edge 25b and the notch 25e but also the boundary M between the tailing-side edge 25b and the notch 25f less collides with the disk D. It is thus possible to produce the magnetic head M3 and the magnetic head device H comprising the magnetic head M3 excellent for a higher recording density, in which damage to the disk and the magnetic head can be suppressed when the flying amount X3 is decreased.

Figure 24:
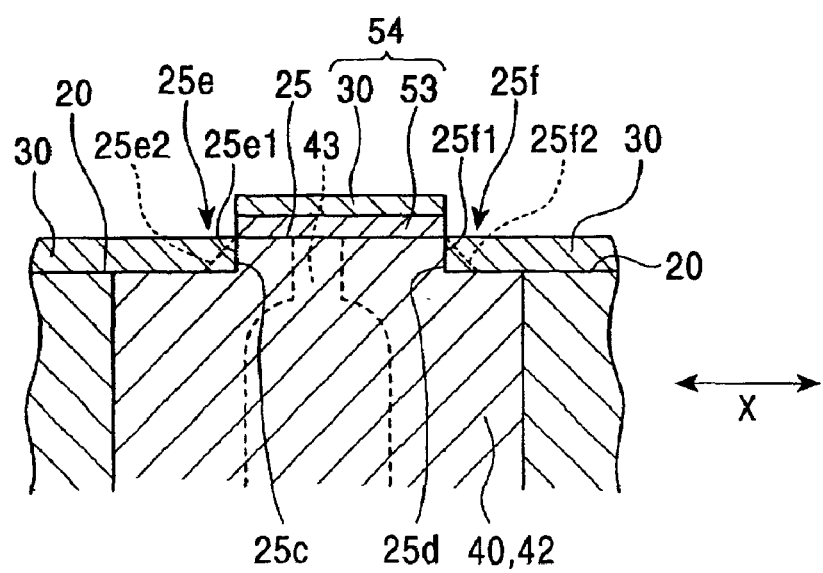
FIG. 24 is a partial sectional view of the magnetic head shown in FIG. 23 taken along line XXIV—XXIV in FIG. 23, as viewed from the direction of an arrow.
Figure 25:
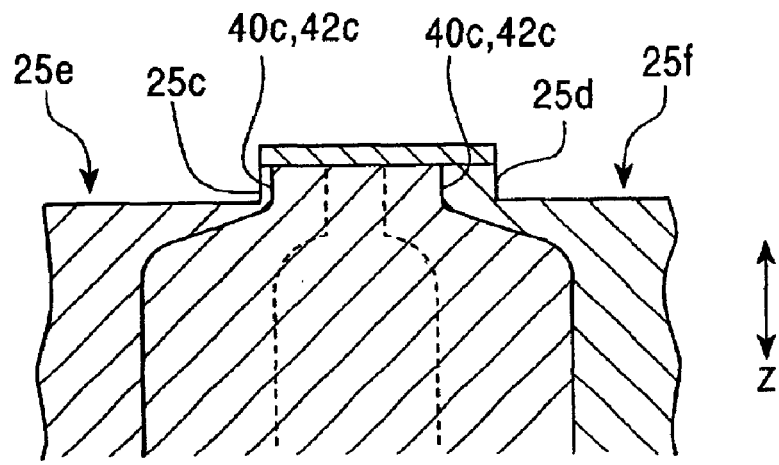
FIG. 25 is a partial sectional view of a magnetic head according to an eighth embodiment of the present invention.

FIGS. 24 and 25 are partial sectional views of the slider S2 taken along line XXIV—XXIV in FIG. 23, as viewed from the direction of an arrow.

In FIG. 24, the notches 25e and 25f formed in the trailing-side ABS 25 are formed, for example, up to the same plane as the recording medium-facing surface 20 to protrude the portions of the upper shield layer 42 and the lower shield layer 40, which are extended beyond the magnetic functional portion G in the width direction of the slider S2, from both side edges 25c and 25d of the trailing-side ABS 25. The protruding portions are exposed at the steps (both side ends) 25c and 25d at the edges of the trailing-side ABS 25, and the recording medium-facing surface 20 retreating from the trailing-side ABS 25 through the steps 25c and 25d.

In this embodiment, a protecting layer 30 made of diamond-like carbon (DLC) is formed on the recording medium-facing surface 20 to prevent corrosion of the upper shield layer 42 and the lower shield layer 40 exposed at the recording medium-facing surface 20.

Also, a protecting layer is preferably formed on the trailing-side ABS 25. The protecting layer 54 formed on the trailing-side ABS 25 has a laminated structure comprising protecting layers 30 and 53, the protecting layer 30 being made of diamond-like carbon (DLC).

This laminated structure of the protecting layer 54 formed on the trailing-side ABS 25 can be formed as follows. First, as shown in FIG. 26, the protecting layer 53 is formed over the entire surface of the slider S2, and then a resist 33 is coated on the trailing-side ABS 25 and the other ABSs. Then, a portion of the protecting layer 53 and a portion of the slider S2, which are not coated with the resist 33, are etched off to form the recording medium-facing surface 20 and the step surface which are lower than the trailing-side ABS 25 (refer to the step shown in FIG. 27). Then, as shown in FIG. 28, the protecting layer 30 is formed over the entire surface including the recording medium-facing surface 20 and the ABSs. Therefore, the protecting layer 53 is first formed on the trailing-side ABS 25, and then the protecting layer 30 is formed on the protecting layer 53.

As shown in FIG. 24, the side surfaces of the notches 25e and 25f may be vertical surfaces vertically rising from the recording medium-facing surface 20 to the trailing-side ABS 25, or inclined surfaces 25e 2 and 25f 2 inclined from the recoding medium-facing surface 20 to the trailing-side ABS 20 or curved surfaces.

The shape of the side surfaces of the notch is true for the notch 25e shown in FIG. 22.

In FIG. 25, the trailing-side ends 42c and 40c of the upper shield layer 42 and the lower shield layer 40 partially protrude from both side ends 25c and 25d, respectively, of the trailing-side ABS 25, the protruding portions being formed at a larger distance from the disk than the magnetic functional portion G. Furthermore, the protruding portions of the magnetic element are buried so as not to appear in both the steps 25c and 25d at the edges of the trailing-side ABS 25 and the recording medium-facing surface 20 retreating from the trailing-side ABS 25 through the steps 25e and 25d.

In this case, unlike in FIG. 24, the protecting layer 30 need not be provided on the trailing-side ABS 25, thereby simplifying the manufacturing process.

Each of the magnetic elements 22 shown in FIGS. 22 and 23 is provided at the trailing side end 21 of the slider S2, and the protecting layer 50 made of a nonmagnetic material is preferably provided on the trailing-side end 21 to cover the magnetic element 22.

By providing the protecting layer 50, the magnetic element 22 can be prevented from being exposed directly to the outside air and the various solvents used in the process for manufacturing a magnetic head, thereby preventing corrosion of the magnetic element 22.

As shown in FIGS. 22 and 23, when the magnetic element 22 is coated with the protecting layer 50, the trailing-side ABS 25 and the steps 25e and 25d at the edges of the trailing-side ABS 25 are continuously formed to extend from the slider S2 to the protecting layer 50. In the case shown in FIG. 24, the protruding portions of the magnetic element 22 are formed to be coplanar with the surface of the protecting layer 50 (coplanar with the recording medium-facing surface 20).

In the case shown in FIG. 25, the protruding portions of the magnetic element 22 are buried in the protecting layer 50.

In the magnetic heads M2 of the present invention described above with reference to FIGS. 16 to 25, the magnetic functional portion G is formed near the left side end 20a of the slider S2. However, the magnetic functional portion G may be formed near the right side end 20b of the slider S2.

In the embodiments shown in FIGS. 19, 22 and 23, the ends of the upper shield layer 42 and the lower shield layer 40 are formed to protrude from the trailing-side ABS 25, and the protruding portions are exposed at the recording medium-facing surface 20 retreating from the trailing-side ABS 25 by a step, or buried in the slider S2 so as not to appear in the recording medium-facing surface 20. However, a step surface at the same height as the step surface 17 protruding from the recording medium-facing surface 20 may be formed in the protruding portions so that the edges of the upper shield layer 42 and the lower shield layer 40 are exposed at the step surface or buried in the slider so as not to appear in the step surface.

The magnetic head device shown in FIG. 29 can be applied to the CSS system as well as a lamp load system.

As described in detail above, according to the present invention, a magnetic element comprises a laminate of a plurality of films, and a magnetic functional portion positioned in an intermediate portion of the magnetic element in the track width direction. In the magnetic element, the portions outside the magnetic functional portion are formed at a larger distance from a recording medium than the magnetic functional portion. Therefore, the magnetic element is supported by a support so that the magnetic functional portion is brought nearer the recording medium than the outside portions.

In the present invention, the magnetic element is supported by the support such as a slider so that only the magnetic functional portion is positioned on the recording medium-facing surface side, the other portions retreating therefrom. Therefore, when the support such as the slider is miniaturized, versatility can be imparted to the shape of the support.

Also, the portions which do not contribute to recording and reproducing are not exposed, thereby preventing excessive corrosion and damage to the medium by a shield layer or the like during sliding on the recording medium.

In the present invention, the support is the slider opposed to the recording medium, and an ABS is formed on the recording medium-facing surface of the slider so as to protrude to the recording medium side and extend from the slider to a protecting layer. The magnetic functional portion of the magnetic element is exposed at the ABS or positioned near the ABS, and the portions of the magnetic element outside the magnetic functional portion are partially extended beyond the ABS in the width direction. The front edges of the outside portions are preferably buried in the protecting layer without appearing in the surface of the protecting layer.

In the present invention, the ABS can be formed in such a small size that at least one of the portions outside the magnetic functional portion is extended beyond the ABS in the width direction. Therefore, when the flying amount between the magnetic functional portion and a disk is decreased, collision between the trailing-side corner of the ABS and the disk can be avoided, and adhesion torque in CSS driving can be decreased.

Furthermore, in the present invention, the magnetic functional portion of the magnetic element is provided at the position deviating, to one of the side ends, from the center of the maximum width dimension of the ABS protruding from the recording medium-facing surface in which the magnetic functional portion appears. Therefore, the magnetic functional portion can be brought near the corner formed between the trailing-side edge of the ABS and the one side end of the ABS, as compared with a conventional magnetic element.

Therefore, the flying amount between the magnetic functional portion and the disk can be decreased, and collision between a corner of the ABS and the disk can be avoided, thereby permitting an attempt to appropriately decrease the flying amount of a magnetic head and the manufacture of a magnetic head excellent for a higher recording density.

Also, in the present invention, only the position of the magnetic functional portion is changed without a change in surface area of the magnetic functional portion. Therefore, like in a conventional magnetic element, appropriate positive pressure is produced on the ABS to eliminate the need to change the design of the slider and maintain the surface area of the ABS at a sufficient value. It is thus possible to manufacture a magnetic head causing less wearing with a disk surface during CSS driving.

Furthermore, in the present invention, a concave notch is preferably formed in the ABS to extend from the one side end to the center of the ABS to bring the end of the magnetic functional portion in the track width direction nearer the center than the boundary between the trailing-side edge of the ABS and the notch.

In the present invention, the notch is formed, and the end of the magnetic functional portion in the track width direction is brought nearer the center than the boundary. Therefore, the magnetic functional portion can be appropriately brought near the boundary, and even when the flying amount between the magnetic functional portion and the disk is decreased, collision between the boundary of the ABD and the disk can be avoided, thereby permitting the attempt to appropriately decrease the flying amount of the magnetic head, and the manufacture of the magnetic head excellent for a higher recording density.

What is claimed is:

1. A magnetic head comprising a support opposed to a recording medium, and a magnetic element supported by the support and having a magnetic functional portion for performing at least one of magnetic detection and magnetic recording on the recording medium;

wherein the magnetic element comprises a laminate of a plurality of films, and the magnetic functional portion positioned in an intermediate portion of the magnetic element in the track width direction, and the magnetic element has a shape in which a portion outside the magnetic functional portion more retreats from the recording medium than the magnetic functional portion, and is supported by the support so that the magnetic functional portion is brought nearer the recording medium than the outside portion; the magnetic element further comprises an upper shield layer and a lower shield layer each made of a magnetic material and having a predetermined width dimension, and a magnetic sensor portion functioning as the magnetic functional portion positioned between both shield layers, and the portions of both shield layers outside the magnetic functional portion retreat from the magnetic functional portion.

2. A magnetic head according to claim 1, wherein in the magnetic element, the portion outside the magnetic functional portion has an inclined linear or curved front edge which gradually separates from the magnetic functional portion.

3. A magnetic head according to claim 1, wherein the magnetic element is provided on the trailing-side end surface of a slider serving as the support opposed to the recording medium, and a protecting layer made of a magnetic material is provided on the trailing-side end surface to cover the magnetic element.

4. A magnetic head according to claim 3, wherein an ABS is formed on the recording medium-facing surface of the slider to extend from the slider to the protecting layer, the magnetic functional portion of the magnetic element is exposed at the ABS or positioned near the ABS, at least a part of the portion of the magnetic element outside the magnetic functional portion extends beyond the ABS in the width direction so that the front edge of the outside portion is buried in the protecting layer without appearing in the surface of the protecting layer.

5. A magnetic head comprising a support opposed to a recording medium, and a magnetic element supported by the support and having a magnetic functional portion for performing at least one of magnetic detection and magnetic recording on the recording medium;

wherein the magnetic element comprises a laminate of a plurality of films, and the magnetic functional portion positioned in an intermediate portion of the magnetic element in the track width direction, and the magnetic element has a shape in which a portion outside the magnetic functional portion more retreats from the recording medium than the magnetic functional portion, and is supported by the supported so that the magnetic functional portion is brought nearer the recording medium than the outside portion the magnetic element further comprises a lower core layer made of a magnetic material and having a predetermined width dimension, and an upper core layer having a width dimension smaller than the lower core layer and opposed to the lower core layer with a gap provided therebetween, the portion between the lower core layer and the upper core layer serves as the magnetic functional portion, and the portion of the lower core layer outside the magnetic functional portion retreats from the magnetic functional portion.

6. A magnetic head according to claim 5, wherein in the magnetic element, the portion outside the magnetic functional portion has an inclined linear or curved front edge which gradually separates from the magnetic functional portion.

7. A magnetic head according to claim 5, wherein the magnetic element is provided on the trailing-side end surface of a slider serving as the support opposed to the recording medium, and a protecting layer made of a magnetic material is provided on the trailing-side end surface to cover the magnetic element.

8. A magnetic head according to claim 7, wherein an ABS is formed on the recording medium-facing surface of the slider to extend from the slider to the protecting layer, the magnetic functional portion of the magnetic element is exposed at the ABS or positioned near the ABS, at least a part of the portion of the magnetic element outside the magnetic functional portion extends beyond the ABS in the width direction so that the front edge of the outside portion is buried in the protecting layer without appearing in the surface of the protecting layer.

* * * * *

UNITED STATES PATENT AND TRADEMARK OFFICE
CERTIFICATE OF CORRECTION

PATENT NO.   : 6,879,462 B2
DATED        : April 12, 2005
INVENTOR(S)  : Tomoo Otsuka It is certified that error appears in the above-identified patent and that said Letters Patent is hereby corrected as shown below:

Column 26,
Line 50, before "so that the" delete "supported" and substitute -- support -- in its place.
Line 52, immediately after "outside portion" insert -- ; -- (semicolon).

Signed and Sealed this

Twenty-ninth Day of November, 2005

JON W. DUDAS
*Director of the United States Patent and Trademark Office*